United States Patent
Niida

(10) Patent No.: US 7,589,852 B2
(45) Date of Patent: Sep. 15, 2009

(54) IMAGE CAPTURE APPARATUS AND CONTROL METHOD

(75) Inventor: Mitsuo Niida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 789 days.

(21) Appl. No.: 11/000,485

(22) Filed: Nov. 29, 2004

(65) Prior Publication Data

US 2005/0141039 A1  Jun. 30, 2005

(30) Foreign Application Priority Data

Dec. 3, 2003  (JP) .............................. 2003-404881

(51) Int. Cl.
*H04N 1/40* (2006.01)

(52) U.S. Cl. ..................... 358/1.15; 358/1.16

(58) Field of Classification Search ....... 358/1.15–1.18, 358/496; 348/14.1–14.11, 152–155, 208.1, 348/208.4–208.6, 208.13–208.14, 352

See application file for complete search history.

(56) References Cited

U.S. PATENT DOCUMENTS

| | | | |
|---|---|---|---|
| 6,198,833 B1 * | 3/2001 | Rangan et al. | 382/103 |
| 6,415,097 B1 | 7/2002 | Takei et al. | |
| 7,007,888 B2 * | 3/2006 | Brunson et al. | 244/3.18 |
| 7,027,717 B1 | 4/2006 | Tsujii et al. | |
| 7,193,645 B1 * | 3/2007 | Aagaard et al. | 348/211.3 |
| 7,292,770 B2 | 11/2007 | Nakano et al. | |

FOREIGN PATENT DOCUMENTS

| | | |
|---|---|---|
| JP | 05-260425 A | 10/1993 |
| JP | 7-154731 A | 6/1995 |
| JP | 7-154740 A | 6/1995 |
| JP | 9-200674 A | 7/1997 |
| JP | 2001-101790 | 4/2001 |
| JP | 2001-111939 | 4/2001 |
| JP | 2002-218366 A | 8/2002 |
| JP | 2003-061013 A | 2/2003 |
| JP | 2003-250106 | 9/2003 |

* cited by examiner

*Primary Examiner*—Thomas D Lee
*Assistant Examiner*—Stephen M Brinich
(74) *Attorney, Agent, or Firm*—Canon USA Inc IP Div

(57) ABSTRACT

An image capture apparatus (for example, a camcorder) includes a first recording unit, a second recording unit, and a controlling unit. The first recording unit records a moving image on a first recording medium connected to the image capture apparatus. The second recording unit records, on a second recording medium connected to the image capture apparatus, related information including information being used to generate a search command for searching the first recording medium to find the moving image. The controlling unit (a) controls the image capture apparatus to transmit the related information reproduced from the second recording medium to a controller connected to the image capture apparatus, and (b) controls the image capture apparatus based on the search command received from the controller to search the first recording medium to find the moving image.

10 Claims, 24 Drawing Sheets

FIG. 3

| Word Name | | MSB | | | | | | | LSB |
|---|---|---|---|---|---|---|---|---|---|
| PC0 | (ITEM) | | | | | | | | |
| PC1 | (DATA) | | | | | | | | |
| PC2 | | | | | | | | | |
| PC3 | | | | | | | | | |
| PC4 | | | | | | | | | |

FIG. 4A

| | MSB | | | | | | | LSB |
|---|---|---|---|---|---|---|---|---|
| PC0 | 1 | 0 | 1 | 0 | 0 | 0 | 0 | 0 |
| PC1 | (MSB) | | | | | | | |
| PC2 | | | | | | | | |
| PC3 | CASSETTE ID 1st QUADLET | | | | | | | |
| PC4 | | | | | | | | (LSB) |

FIG. 4B

| | MSB | | | | | | | LSB |
|---|---|---|---|---|---|---|---|---|
| PC0 | 1 | 0 | 1 | 0 | 0 | 0 | 0 | 1 |
| PC1 | (MSB) | | | | | | | |
| PC2 | | | | | | | | |
| PC3 | CASSETTE ID 2nd QUADLET | | | | | | | |
| PC4 | | | | | | | | (LSB) |

FIG. 4C

| | MSB | | | | | | | LSB |
|---|---|---|---|---|---|---|---|---|
| PC0 | 1 | 0 | 1 | 0 | 0 | 0 | 1 | 0 |
| PC1 | (MSB) | | | | | | | |
| PC2 | | | | | | | | |
| PC3 | CASSETTE ID 3rd QUADLET | | | | | | | |
| PC4 | | | | | | | | (LSB) |

FIG. 4D

| | MSB | | | | | | | LSB |
|---|---|---|---|---|---|---|---|---|
| PC0 | 1 | 0 | 1 | 0 | 0 | 0 | 1 | 1 |
| PC1 | (MSB) | | | | | | | |
| PC2 | | | | | | | | |
| PC3 | CASSETTE ID 4th QUADLET | | | | | | | |
| PC4 | | | | | | | | (LSB) |

FIG. 22

| VALUE | MEANING |
|---|---|
| $A0_{16}$ | asynchronous plug[0] |
| ⋮ | ⋮ |
| $BE_{16}$ | asynchronous plug[30] |
| $BF_{16}$ | any available asynchronous plug |

FIG. 23

| VALUE | MEANING |
|---|---|
| $00_{16}$ | consumer port |
| $00_{16}$ | producer port[1] |
| ⋮ | ⋮ |
| $0E_{16}$ | producer port[14] |
| $0F_{16}$ | any available producer port |

FIG. 24

| port id | port bits | symbol | MEANING |
|---|---|---|---|
| $00_{16}$ | $X1_2$ | ct == 1 | Writing in segment buffer of this consumer port in any order is allowed |
| | $X0_2$ | ct == 0 | Only sequential writing in segment buffer of this consumer port from head is allowed |
| | $1X_2$ | m == 1 | This consumer port supports multicast connection |
| | $0X_2$ | m == 1 | This consumer port does not support multicast connection |
| $01_{16} \sim 0E_{16}$ | $00_2$ | FIXED | This port supports only fixed-size segment buffer |
| | $01_2$ | FRAME | This port supports change in size of segment buffer for every frame |
| | $10_2$ | SEGMENT | This port supports change in size of segment buffer for every segment |
| | $11_2$ | — | reserved |

FIG. 25

| mode | VALUE | MEANING |
| --- | --- | --- |
| FREE | 0 | Connection is broken |
| MORE | 1 | Transmission of segment data is completed (subsequent segment data exists) |
| SUSPENDED | 2 | Change of consumer to suspended mode is confirmed |
| — | 3 | reserved |
| LAST | 4 | Transmission of segment data is completed (transmission of last segment data in frame is completed) |
| LESS | 5 | Transmission of frame data is suspended (transmitted data is effective) |
| JUNK | 6 | Transmission of frame data is suspended (transmitted data is ineffective) |
| LOST | 7 | TOSS notification from consumer is confirmed |

FIG. 26

| mode | VALUE | MEANING |
| --- | --- | --- |
| FREE | 0 | Connection is broken |
| — | 1 | reserved |
| SUSPEND | 2 | Notification of change to suspended mode |
| — | 3 | reserved |
| RESUME | 4 | Notification of return from suspended mode |
| SEND | 5 | Request for transmitting segment data |
| — | 6 | reserved |
| TOSS | 7 | Notification of discard of subsequent segment data (frame data is not used) |

FIG. 27

| Tag Name | Content | Tag Number | Type | Count | Number of Tags | Level |
|---|---|---|---|---|---|---|
| TimeCode | Timecode on tape | $2000_{16}$ | BYTE | 4 | 1 | M |
| ATN | ATN on tape | $2001_{16}$ | BYTE | 4 | 1 | M |
| UUID | UUID of cassette | $2011_{16}$ | LONG | 4 | 1 | O |
| Recording Date | Recording date of tape | $2020_{16}$ | BYTE | 4 | 1 | O |
| Recording Time | Recording time of tape | $2021_{16}$ | BYTE | 4 | 1 | O |

IMAGE CAPTURE APPARATUS AND CONTROL METHOD

BACKGROUND OF THE INVENTION

1. Field of the Invention

The present invention relates to control of an image capture apparatus, for example, a camcorder.

2. Description of the Related Art

Video data, which is captured by a moving-image capture apparatus including a camcorder and is recorded on a recording medium including a video tape, is usually a collection of so-called clips, that is, a series of videos continuously captured. Each clip is often relatively short in the case of the camcorder. Accordingly, it is necessary to searching for a desired clip in order to confirm the content or to edit the videos after the videos are captured.

Methods of searching for clips are disclosed in Japanese Patent Laid-Open No. 7-154731 (Patent Document 1), Japanese Patent Laid-Open No. 7-154740 (Patent Document 2), and Japanese Patent Laid-Open No. 9-200674 (Patent Document 3). For example, in the methods disclosed in Patent Documents 1 and 2, an index is created for the captured image data or audio data that is recorded on a recording medium, and the created index is recorded on a recording medium different from the one having the image recorded thereon or is recorded in an area next to the image area on the recording medium on which the image is recorded.

In the method disclosed in Patent Document 3, information including recording times, recording contents, and titles is recorded in a semiconductor memory device, such as a flash memory, which is incorporated in a cassette housing a video tape. In addition, in the method disclosed in Patent Document 3, the index images for every clip are collectively recorded on a video tape, and information indicating the recording area, on the video tape, of each clip and the recording area of the corresponding index image is recorded in the semiconductor memory device in the cassette housing the video tape.

Editing software run on a personal computer or the like that is connected to a camcorder through a digital interface has increasingly been in widespread use. Also in this case, it is necessary to search for a desired clip, as described above.

However, in the above example, there is a problem in that a desired clip cannot be searched for through the digital interface by remote control. Furthermore, even when the camcorder is connected to another device through the digital interface, a desired clip must be searched for on the camcorder or an operator must manually repeat a tape operation, such as fast-forward or rewind, by the remote control to search for a desired clip.

SUMMARY OF THE INVENTION

An object of the present invention is to overcome the drawbacks described above.

Another object of the present invention is to provide an image capture apparatus and a control method capable of searching for a desired clip (moving image) with a simple operation.

In an aspect of the present invention, an image capture apparatus includes a first recording unit adapted to record a moving image on a first recording medium; a second recording unit adapted to record, on a second recording medium, related information including information required for searching for the moving image; and a controlling unit adapted to control the image capture apparatus to transmit the related information reproduced from the second recording medium to a controller connected to the image capture apparatus and control the image capture apparatus to search for the moving image in accordance with a command transmitted from the controller.

In another aspect of the present invention, a control method controls an image capture apparatus that includes a first recording unit adapted to record a moving image on a first recording medium, and a second recording unit adapted to record, on a second recording medium, related information including information required for searching for the moving image. The control method includes steps of transmitting the related information reproduced from the second recording medium to a controller connected to the image capture apparatus; and searching for the moving image in accordance with a command transmitted from the controller.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 illustrates a basic structure of a pack.

FIGS. 4A to 4D illustrate a recording format of cassette identification information.

FIG. 22 shows an example of codes set in a plug id field.

FIG. 23 shows an example of codes set in a port id field.

FIG. 24 shows an example of codes set in a port bits field.

FIG. 25 shows an example of codes set in a mode field in the iAPR.

FIG. 26 shows an example of codes set in a mode field in the oAPR.

FIG. 27 illustrates information stored in a maker note area.

DESCRIPTION OF THE EMBODIMENTS

First Embodiment

Embodiments of the present invention will be described in detail below with reference to the drawings. In the embodiments, IEEE1394 includes IEEE Std 1394 to 1995 and IEEE Std 1394a to 2000.

Figure 1:
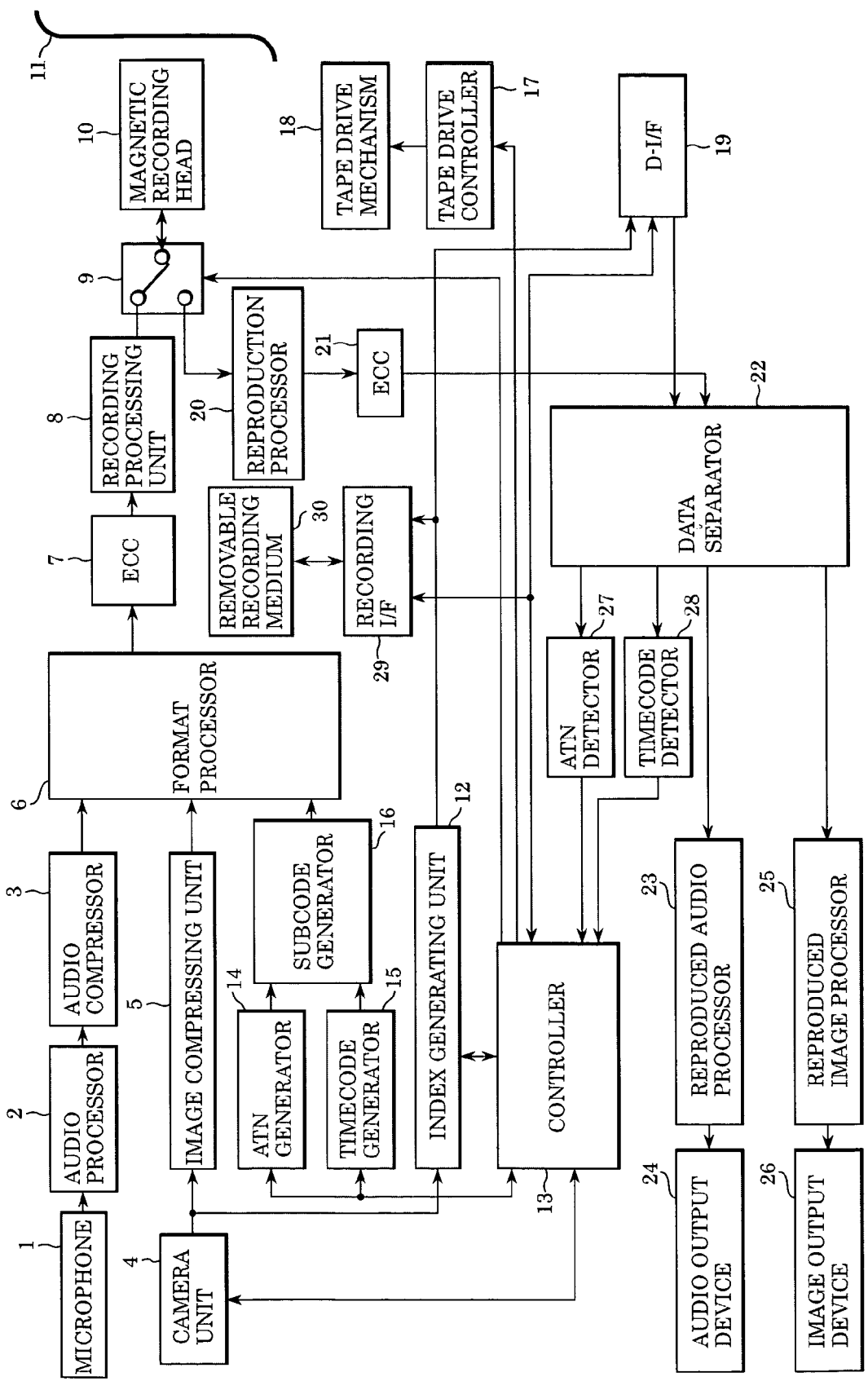
FIG. 1 is a block diagram showing an example of the structure of a camcorder according to an embodiment of the present invention.

FIG. 1 is a block diagram showing an example of the structure of a camcorder according to an embodiment of the present invention. Referring to FIG. 1, the camcorder includes a microphone 1, an audio processor 2, an audio compressor 3, a camera unit 4, an image compressing unit 5, a format processor 6, an error correction coding unit 7, a recording processing unit 8, a selector 9, a magnetic recording head 10, a recording medium 11 such as a magnetic tape, an index generating unit 12, a controller 13, an absolute track number (hereinafter referred to as ATN) generator 14, a timecode generator 15, a subcode generator 16, a tape drive controller 17 for controlling drive of a tape, a tape drive mechanism 18 for driving the tape, a digital interface (hereinafter referred to as D-I/F) 19 conforming to the IEEE1394, a reproduction processor 20, an error correction decoder 21, a data separator 22, a reproduced audio processor 23, an audio output device 24, a reproduced image processor 25, an image output device 26, an ATN detector 27, a timecode detector 28, a recording interface (hereinafter referred to as recording I/F) 29, and a removable recording medium 30 such as a memory card.

A recording operation is described below. An audio signal input with the microphone 1 is subjected to, for example, analog-digital conversion or filtering in the audio processor 2. The digitized audio signal is compressed and encoded in the audio compressor 3 and is supplied to the format processor 6.

The camera unit 4 includes a charge-coupled device (CCD), a filter, and a camera processor, which are not shown. The camera unit 4 converts a signal captured by the CCD into a television signal based on a control signal supplied from the controller 13 and supplies the converted signal to the filter. The filter converts a 4:2:2 format video signal, which is supplied from the camera unit 4, into a 4:1:1 format video signal. The converted video signal is supplied to the image compressing unit 5.

The image compressing unit 5 includes a block separator, a discrete cosine transformer, a movement detector, a sorter, a quantizer, an amount-of-coding estimator, and a variable-length coder, which are not shown. The block separator separates each frame of the video signal supplied from the filter in the camera unit 4 into 8×8 macroblocks. The image compressing unit 5 performs discrete cosine transform (DCT) coding for the video signal separated into the macroblocks and further performs quantization and variable-length coding for video signals. Specifically, in the image compressing unit 5, the movement detector detects a movement of the video signal for every 8×8 macroblock, which is supplied from the block separator. The discrete cosine transformer then performs the discrete cosine transformation. The sorter sorts the transformed elements in the order of frequency such that direct-current (DC) components of the video signal are located at predetermined positions. The amount-of-coding estimator estimates an amount of coding based on the sorted elements to determine a quantization level based on the estimated value, and the quantizer performs adaptive quantization. The variable-length coder supplies coded data, which is generated by performing variable-length coding for the quantized video signal, to the format processor 6. According to this embodiment, the variable-length coder performs, for example, two-dimensional Huffman coding.

The ATN generator 14 generates an ATN, which is an absolute number of each track recorded on the magnetic tape 11 from its starting point. The timecode generator 15 is a timing unit for generating a timecode, which serves as an index indicating a recording position or the like of the signal, and outputting the generated timecode to the format processor 6. The output time is an absolute time or a relative time, which can be arbitrarily selected. The relative time is reset by mounting/removal of a video cassette in which the recording medium 11 is housed or by depression of a reset button by a user. The ATN signal and the timecode signal are supplied to the subcode generator 16. The subcode generator 16 generates usable information including the timecode and the ATN as a subcode and supplies the subcode to the format processor 6.

The format processor 6 converts each signal supplied from the audio compressor 3, the image compressing unit 5, and the subcode generator 16 into a bit stream appropriate for the recording format. The format processor 6 also adds insert track information (ITI) data in use for generating an operating clock in reproduction and supplies the ITI to the error correction coding unit 7. The format processor 6 further adds identification (ID) information on the video cassette to the bit stream in accordance with an instruction from the controller 13 during the conversion into the bit stream. The ID information on the video cassette is, for example, a universal unique identifier (UUID) having a length of 16 bytes, which is generated by various algorithms that have already been disclosed.

The error correction coding unit 7 adds a parity bit to the coded data supplied from the format processor 6 to generate record data and supplies the record data to the recording processing unit 8. According to this embodiment, the error correction coding unit 7 uses a Reed-Solomon product code in which an error correction block is two-dimensionally structured. Specifically, the error correction coding unit 7 includes a shuffler and an error-correction-code adder, which are not shown. In the error correction coding unit 7, the error-correction-code adder adds an outer-code parity bit to the supplied coded data, the shuffler performs shuffling and adds a synchronization signal and an ID code, and the error-correction-code adder adds an inner-code parity bit.

The recording processing unit 8 includes a channel coder and a recording amplifier, which are not shown. The record data supplied from the error correction coding unit 7 is converted into a digital bit sequence appropriate for magnetic recording characteristics of the recording medium 11, such as a magnetic tape, in the channel coder. The converted digital bit sequence is amplified in the recording amplifier. The amplified data is applied to the magnetic recording head 10 through the selector 9 and is recorded at a predetermined position on the magnetic tape 11. Concurrently, the controller 13 outputs a control signal to the tape drive controller 17 to control the tape drive mechanism 18 so as to drive the recording medium 11 at a speed corresponding to the recording mode. The controller 13 also drives the recording medium 11 at a speed corresponding to the recording mode or reproduction mode in accordance with each operation signal output from an operation unit (not shown).

When a recording start signal is supplied from the operation unit (not shown) to the controller 13, recording on the recording medium 11 is started and the index generating unit 12 generates an index image corresponding to a clip of the video signal to be recorded. The index image is supplied to the recording I/F 29 as an image typifying the clip and is recorded in the removable recording medium 30. Information indicating a position of the clip on the magnetic tape 11, such as the timecode or the ATN described above, is supplied to the recording I/F 29 through the controller 13 and is recorded in the removable recording medium 30. ID information that uniquely identifies the video cassette housing the magnetic tape 11 and information indicating the date and time when the above clip is recorded are also recorded in the removable recording medium 30.

Figure 2:
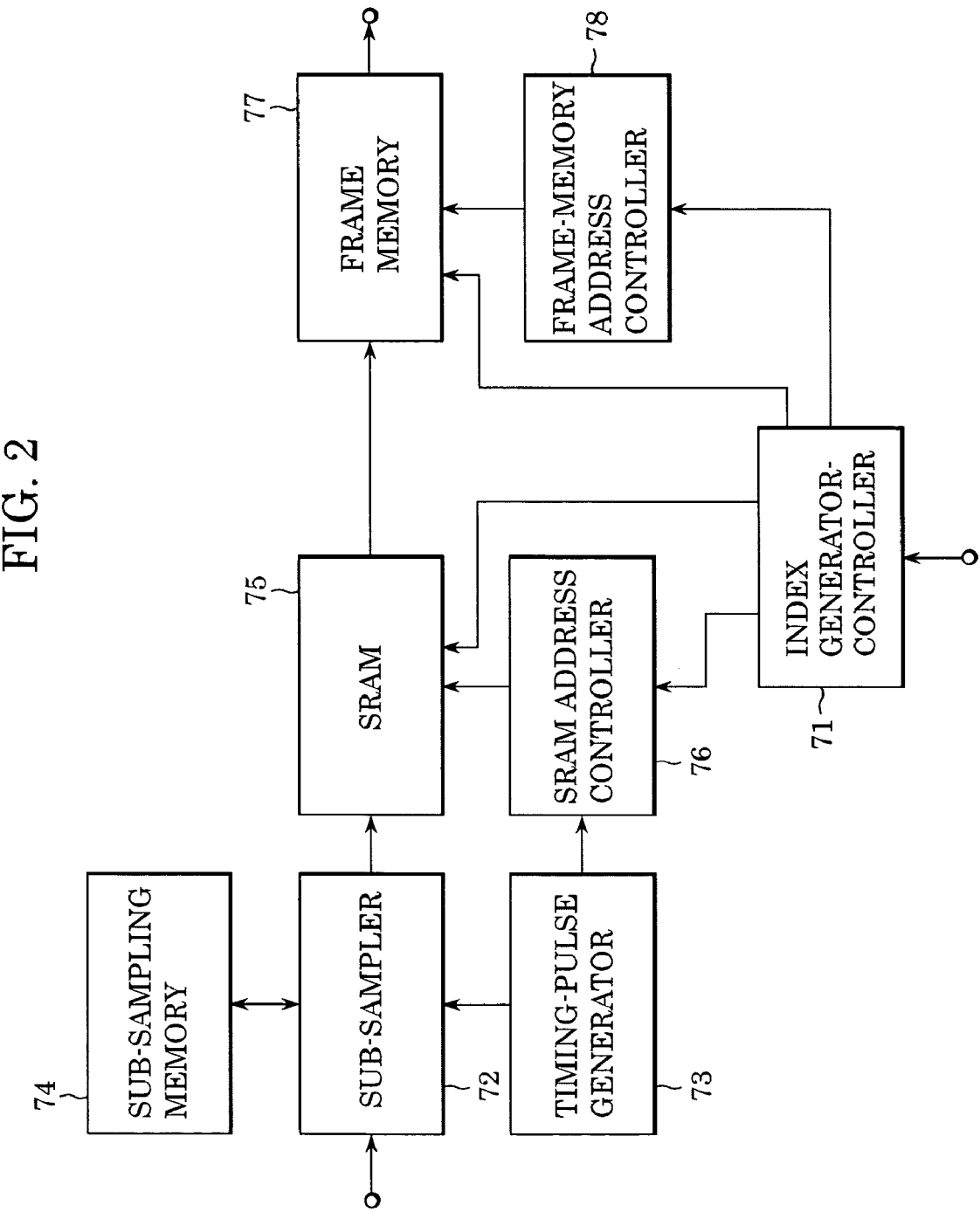
FIG. 2 is a block diagram showing the structure of an index generating unit in the camcorder in FIG. 1.

A process of generating the index image described above is described below. The index generating unit 12 extracts, based on the video signal supplied from the camera unit 4, an image appropriate for search for the content of each clip and generates the index image (sometimes referred to as an index picture) by using the images extracted from multiple clips. The index generating unit 12 supplies the generated index image to the recording I/F 29 at a predetermined timing such that the index image is recorded in the removable recording medium 30. As shown in FIG. 2, the index generating unit 12 includes an index generator-controller 71, a sub-sampler 72, a timing-pulse generator 73, a sub-sampling memory 74, a static random access memory (SRAM) 75, an SRAM address controller 76, a frame memory 77, and a frame-memory address controller 78.

The index generator-controller 71 controls each component in the index generating unit 12 based on a control signal supplied from the controller 13. A control process by the index generator-controller 71 is described below in the description of each component. The sub-sampler 72 and the sub-sampling memory 74 read image data supplied from the camera unit 4 at a predetermined timing based on a pulse supplied from the timing-pulse generator 73, calculate a direct-current (DC) component, and supply the calculated DC component to the SRAM 75. Specifically, the timing-pulse generator 73 generates the pulse to be supplied to the sub-sampler 72 in order to extract an image for use in the index image from the first video data of each clip. The sub-sampling memory 74 stores the image data corresponding to eight lines, supplied from the sub-sampler 72, and outputs the image data corresponding to 8×8 pixel blocks in accordance with addresses input from the sub-sampler 72. The sub-sampler 72 calculates the DC component from the image data corresponding to the 8×8 pixel blocks.

The address of the SRAM 75 is controlled by the SRAM address controller 76. Timing at which data is written in and/or read out from the SRAM 75 is controlled by the index generator-controller 71. The SRAM 75 sequentially stores one piece of data for every macroblock supplied from the sub-sampling memory 74 and finally stores the image corresponding to the first video data of each clip. As described above, since the sub-sampler 72 sequentially outputs one DC component for every 8×8 pixel block as a representative value, the image finally stored in the SRAM 75 is an image given by vertically and horizontally reducing in size the original video data to an eighth part. The SRAM address controller 76 controls the address of the SRAM 75, based on the control signal supplied from the index generator-controller 71, to store pixel data sequentially supplied from the sub-sampling memory 74 to the SRAM 75 in the SRAM 75 such that the pixel data forms an image in the SRAM 75.

The frame memory 77 stores the data associated with the frames of the video data. The frame memory 77 according to this embodiment stores, for example, video data corresponding to seven frames. The address of the frame memory 77 is controlled by the frame-memory address controller 78. The frame memory 77 sequentially stores the image of each clip, which is sequentially formed in the SRAM 75, based on the control signal supplied from the index generator-controller 71. Since the frame memory 77 according to this embodiment is a flash memory, the recorded content is held even when the camcorder is turned off. The recorded content is deleted based on the control signal supplied through the index generator-controller 71 in response to the instruction from the controller 13. Since the image stored in the SRAM 75 is given, for example, by vertically and horizontally reducing in size the original video data to an eighth part, that is, by reducing in area the original video data to a sixty-fourth part, 64 images are stored in an area, on the frame memory 77, corresponding to one frame. Accordingly, when an arbitrary clip is recorded, an operator can select an index image from among the 64×7 images on completion of the recording to record the selected index image on the removable recording medium 30. According to this embodiment, the operator can advantageously select an index image that best represents an arbitrary clip. The frame-memory address controller 78 controls the address of the frame memory 77, based on the control signal supplied from the index generator-controller 71, such that the image data supplied from the SRAM 75 to the frame memory 77 is stored in the appropriate position described above.

Referring back to FIG. 1, when the operator instructs a reproduction operation through a user interface (not shown), the controller 13 controls the tape drive mechanism 18 through the tape drive controller 17 to drive the magnetic tape 11 in order to start the reproduction operation. The magnetic recording head 10 reads out the data recorded on the magnetic tape 11 and performs the reproduction process, such as amplification, in the reproduction processor 20 through the selector 9. The reproduction signal converted into digital data through the above reproduction process is supplied to the error correction decoder 21. The reproduction data, which is subjected to the error correction process in the error correction decoder 21, is separated into subcode data, including audio data, the image data, the timecode, and the ATN, in the data separator 22. When the ID information on the video cassette is added, the reproduction data is similarly separated and is supplied to the controller 13.

The audio data is subjected to audio processing, such as decompression, in the reproduced audio processor 23 and is output from the audio output device 24. The image data is subjected to image processing, such as decompression, in the reproduced image processor 25 and is output from the image output device 26. The timecode and the ATN in the subcode are detected in the timecode detector 28 and the ATN detector 27, respectively, and are supplied to the controller 13.

As described above, the index image and positional information, on the magnetic tape, of the video image of the clip from which the index image is cut are stored in the removable recording medium 30. When the index image is selected through the user interface (not shown), the camcorder of this embodiment reads out the tape position information, which is recorded in the removable recording medium 30 along with the index image. The tape position information includes the timecode and the ATN, as described above. The controller 13 drives the magnetic tape 11 based on the readout time code and the ATN to start the reproduction operation from the corresponding position on the magnetic tape. The reproduction of the clip from which the index image is cut is automatically performed in the manner described above.

The index image and the ID information on the video cassette, associated with the index image, are recorded in the removable recording medium 30. The ID information on the video cassette in which the magnetic tape 11 is housed is also recorded in the recording medium 11. Hence, when the ID information on the video cassette recorded in the removable recording medium 30 is different from the ID information on the video cassette recorded in the recording medium 11, an alarm may be generated or insertion of a correct removable recording medium 30 may be prompted.

Structure of ID Information on Video Cassette

According to this embodiment, the ID information on the video cassette described above is recorded on the magnetic tape 11 based on, for example, IEC-61834 Helical-scan digital video cassette recording system using 6, 35 mm magnetic tape for consumer use (525-60, 625-50, 1125-60, and 1250-50 systems) standard. According to the above standard, an audio auxiliary data (AAUX) area in an audio area, a video auxiliary data (VAUX) area in a video area, and an auxiliary (AUX) data recording area in a subcode area are available as areas where subsidiary information is recorded on the magnetic tape. The recording area of the subsidiary information is a collection of data units, referred to as packs, each having a fixed length of five bytes.

FIG. 3 shows a basic structure of each pack having a fixed length of five bytes. A first byte (PC0) of the pack is a pack header indicating the content of data in the pack. Arbitrary data whose data structure is determined by the pack header is described in four bytes (PC1 to PC4) subsequent to the pack header.

The pack header is divided into higher four bits and lower four bits. Data indicating the application of the data subsequent to the pack header is described in a higher nibble, that is, the higher four bits of the pack header. Data indicating the specific content of the data subsequent to the pack header is described in a lower nibble, that is, the lower four bits of the pack header. Up to 16 types of the higher nibble are provided. Up to 16 types of the lower nibble are provided for every higher nibble. Groups, including control "$0000_2$", title "$0001_2$", chapter "$0010_2$", part "$0011_2$", program "$0010_2$", AAUX "$0101_2$", VAUX "$0110_2$", camera "$0111_2$", line "$10000_2$", MPEG "$1001_2$", and soft "$1111_2$", are defined for the higher nibble of the pack header in the IEC-61834 Helical-scan digital video cassette recording system using 6, 35 mm magnetic tape for consumer use (525-60, 625-50, 1125-60, and 1250-50 systems) standard described above. Each of the above groups is expanded into 16 packs in the lower nibble.

In the IEC-61834 Helical-scan digital video cassette recording system using 6, 35 mm magnetic tape for consumer use (525-60, 625-50, 1125-60, and 1250-50 systems) standard, no data is defined for the higher nibble, having any value from $1010_2$ to $1110_2$, of the pack header. According to this embodiment, for example, the pack data having a value "$1010_2$" in the higher nibble of the pack header is used to record the ID information on the video cassette.

As described above, the ID information on the video cassette of this embodiment is, for example, a UUID having a length of 16 bytes. According to this embodiment, as shown in FIGS. 4A to 4D, the 16-byte UUID is divided into four packs that are recorded on the magnetic tape. Specifically, the four packs having values "$10100000_2$", "$10100001_2$", "$10100010_2$", and "$10100011_2$" in their pack header are used to record the ID information on the video cassette on the magnetic tape. The ID information on the video cassette may be recorded on the magnetic tape by the use of packs having values other than the above values in their pack header.

Operation in Connection through D-I/F

When the D-I/F 19 is connected via a D-IF cable (not shown), a bus reset occurs. After the setting operation in the bus reset is completed, the camcorder of this embodiment waits for a signal supplied from a connected controller (not shown). When the controller outputs a signal including information indicating that the controller controls the camcorder of this embodiment, the camcorder receives the signal, reads out the index image and the data, such as the time code and the ATN, associated with the index image from the removable recording medium 30, and transmits the index image and the data, such as the time code and the ATN, associated with the index image to the controller through the D-I/F 19. At the same time, the ID information on the video cassette or the date and time information may be transmitted.

Figure 5:
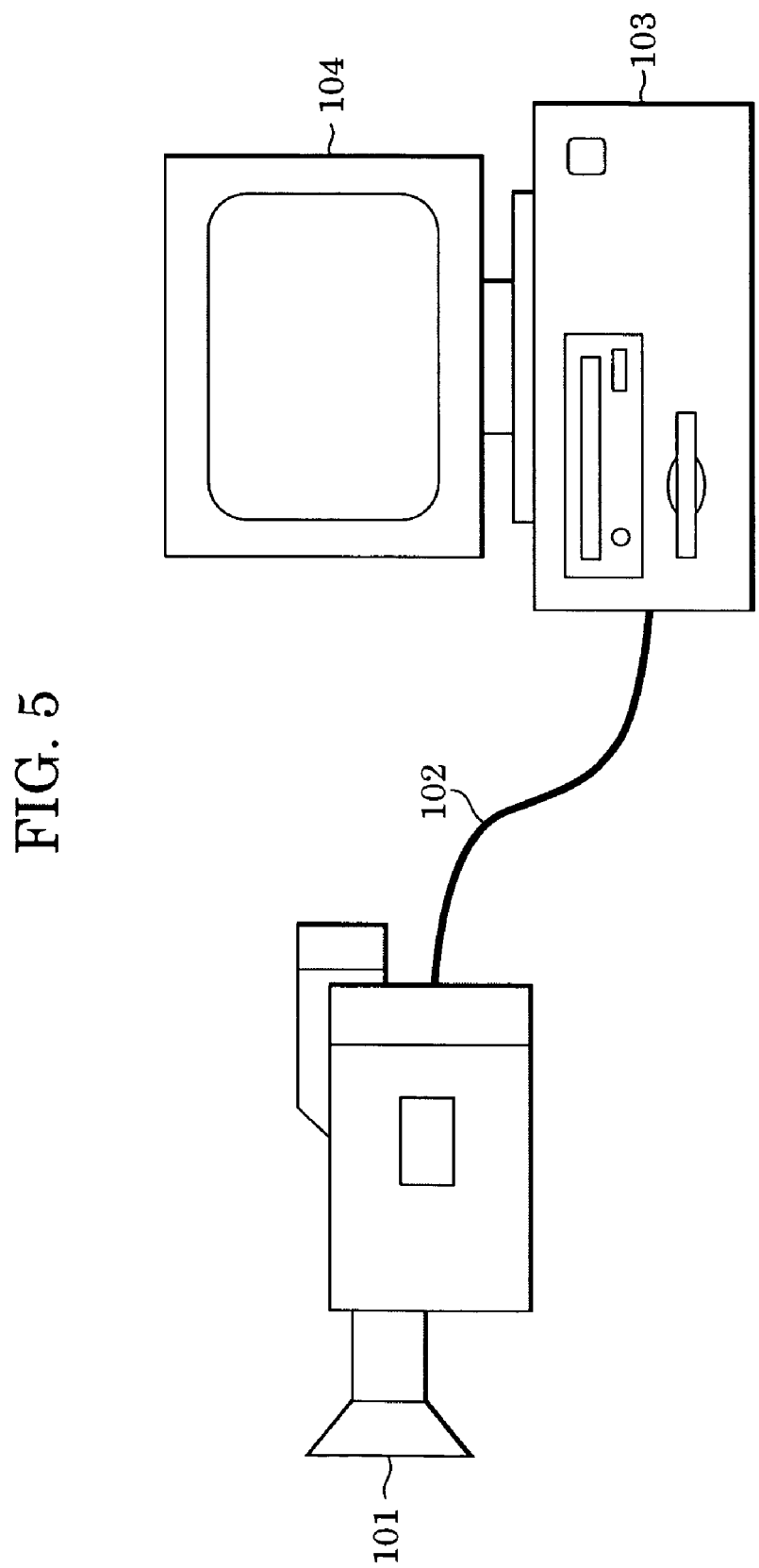
FIG. 5 illustrates an example of the structure of a system including the camcorder.

The data transfer operation described above is described with reference to FIG. 5. Referring to FIG. 5, reference numeral 101 denotes a camcorder to which the present invention is applied. Reference numeral 102 denotes a cable compliant with IEEE1394 (hereinafter referred to as an IEEE1394 cable), reference numeral 103 denotes a personal computer (hereinafter referred to as a PC), and reference numeral 104 denotes a monitor display (hereinafter referred to as a monitor).

When the camcorder 101 is connected to the PC 103 via the IEEE1394 cable 102, a bus reset occurs, as described above. In the PC 103, device driver software (hereinafter referred to as a device driver) is loaded from an internal hard disk device (hereinafter referred to as an HD) on a memory in the PC 103 using the bus reset as a trigger. The device driver is software for controlling IEEE1394-compliant hardware connected to the PC 103. The device driver performs an initialization operation relating to the IEEE1394-compliant hardware using the bus reset as a trigger. Similarly, the camcorder 101 performs an initialization operation relating the IEEE1394 using the bus reset as a trigger.

Figure 6:
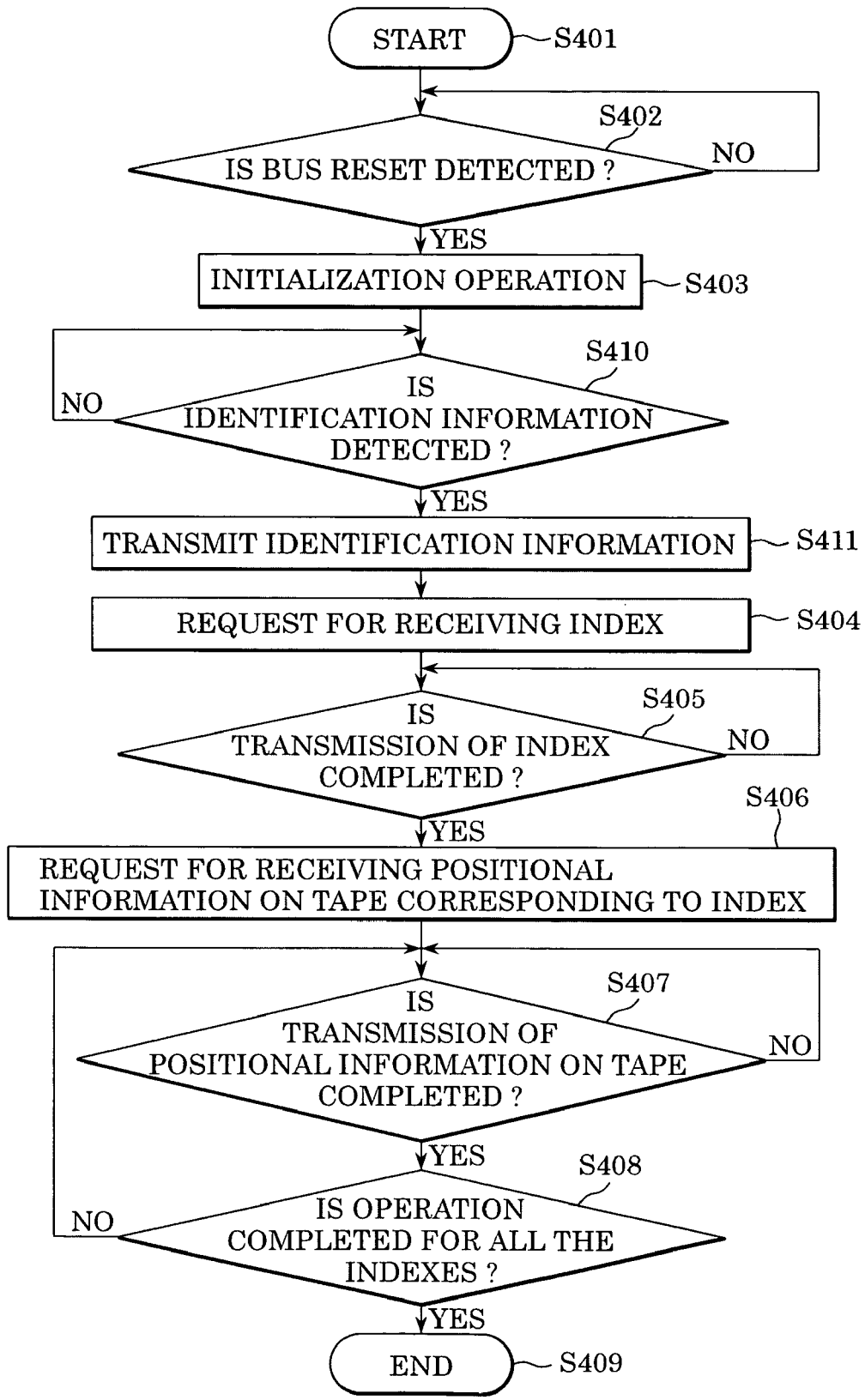
FIG. 6 is a flowchart showing a series of initialization operations of the camcorder.

FIG. 6 is a flowchart showing a series of initialization operations of the camcorder 101. In Step S401, the camcorder 101 starts the series of the initialization operations. In Step S402, the camcorder 101 detects whether a bus reset occurs. If the bus reset does not occur, the camcorder 101 continues the operation of detecting a bus reset. If a bus reset occurs, then in Step S403, the camcorder 101 performs an initialization operation after the bus reset has occurred.

After performing the initialization operation, in Step S410, the camcorder 101 detects whether identification information on the video cassette is read out. As described above, the identification information on the video cassette is recorded in part of the pack area on the magnetic tape 11. If the identification information on the video cassette is read out in Step S410, then in Step S411, the camcorder 101 transmits the identification information on the video cassette to the PC 103 through the D-I/F 19. If the identification information on the video cassette is not read out in Step S410, the camcorder 101 waits for the readout of the identification information on the video cassette and, in Step S411, transmits the identification information on the video cassette to the PC 103 through the D-I/F 19.

In Step S404, the camcorder 101 transmits a request for receiving an index to the PC 103. In Step S405, the camcorder 101 determines whether the transmission of the index is completed. If the transmission of the index is not completed, the camcorder 101 continues the transmission of the index. If the transmission of the index is completed, the camcorder 101 proceeds to Step S406. In Step S406, the camcorder 101 transmits to the PC 103 a request for receiving positional data on the magnetic tape, associated with the index. In Step S407, the camcorder 101 determines whether the transmission of the positional data on the magnetic tape is completed. If the transmission of the positional data on the magnetic tape is not completed, the camcorder 101 continues the transmission of the positional data on the magnetic tape. If the transmission of the positional data on the magnetic tape is completed, the camcorder 101 proceeds to Step S408.

In Step S408, the camcorder 101 determines whether the above operation is completed for all the indexes. Steps from S405 to S408 form a processing loop. If the above operation is not completed for all the indexes, the camcorder 101 repeats the transmission of the index and the transmission of the positional data, on the magnetic tape, associated with the index. If the above operation is completed for all the indexes, in Step S409, the camcorder 101 completes the operation.

After the camcorder 101 completes the series of initialization operations subsequent to the bus reset, the camcorder 101 uses, for example, a communication protocol called an asynchronous connection to transmit to the PC 103 the index image and the data, such as the time code and the ATN, associated with the index image. The asynchronous connection is described in detail in "AV/C Compatible Asynchronous Serial Bus Connections" (published by 1394 Trade Association) and "AV/C commands for management of Asynchronous Serial Bus Connections" (published by 1394 Trade Association).

Description of Asynchronous Connection

Figure 7:
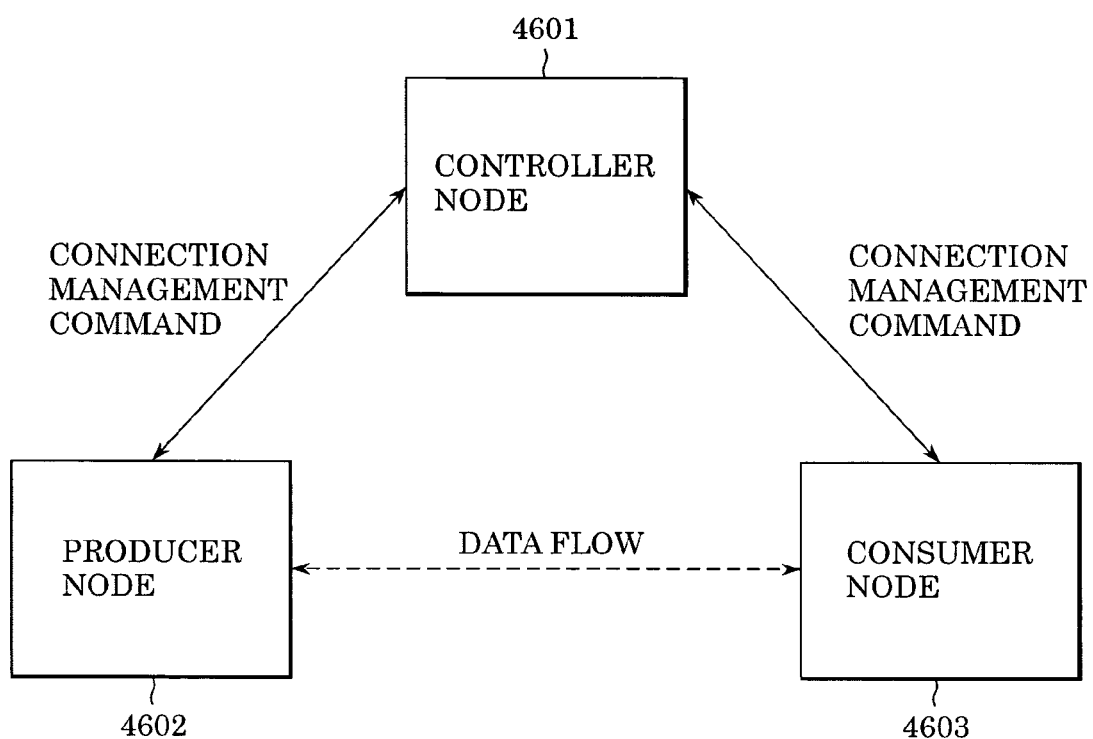
FIG. 7 shows a basic structure of asynchronous connection.

The asynchronous connection used in this embodiment is described below. FIG. 7 shows a basic structure of the asynchronous connection. Referring to FIG. 7, a transmission-side node having a function of transferring data is called a PRODUCER node (hereinafter referred to as a PRODUCER 4602), a reception-side node having a function of receiving the data is called a CONSUMER node (hereinafter referred to as a CONSUMER 4603), and a node having a function of managing the logical connection relationship (that is, connection) established between the PRODUCER 4602 and the CONSUMER 4603 is called a CONTROLLER node (hereinafter referred to as a CONTROLLER 4601). In the asynchronous connection, the data transfer is controlled by the CONTROLLER 4601, the PRODUCER 4602, and the CONSUMER 4603.

Figure 8:
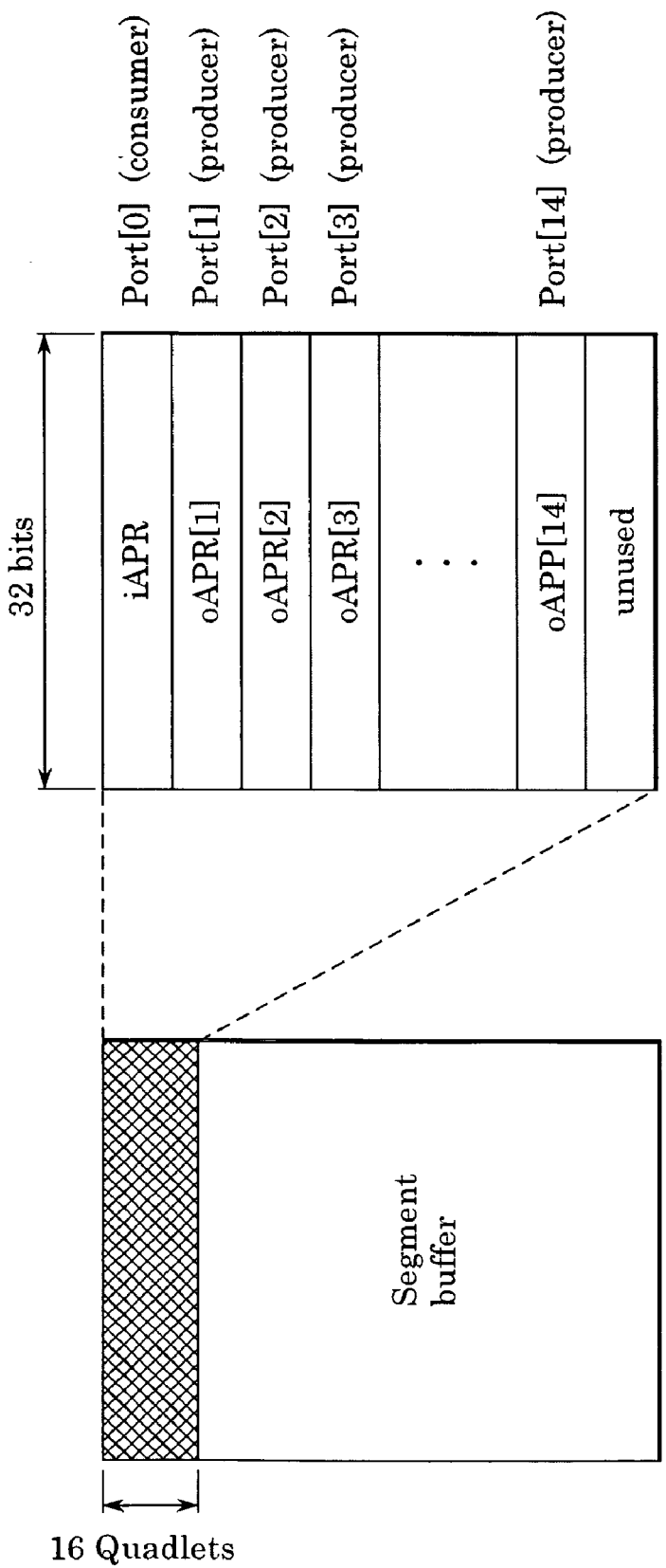
FIG. 8 shows the structure of an asynchronous plug.

The PRODUCER 4602 and the CONSUMER 4603 each have an asynchronous plug for transmitting and/or receiving data. FIG. 8 shows the structure of the asynchronous plug. The asynchronous plug includes one input asynchronous port register (iAPR), more than one output asynchronous port register (oAPR), and a Segment_Buffer for receiving the data, which are allocated to IEEE1394-compliant address spaces. The asynchronous plug is required each time one connection is established. When multiple asynchronous plugs are provided, the asynchronous plugs are identified with their plug ID.

For example, a node having only the function of the PRODUCER 4602 has an asynchronous plug including only the oAPRs. A node having only the function of the CONSUMER 4603 has an asynchronous plug including the iAPR and the Segment_Buffer for receiving the data. A node having both the function of the PRODUCER 4602 and the function of the CONSUMER 4603 has an asynchronous plug including the iAPR, the oAPRs, and the Segment_Buffer. The number of the oAPRs depends on the capability of the PRODUCER 4602. For example, when the data is transmitted to N-number (N denotes an integer not less than one) of CONSUMERs 4603 in one connection, the PRODUCER 4602 has the N-number of oAPRs or more. When the data is transmitted only to one CONSUMER 4603, the PRODUCER 4602 has only one oAPR. When multiple connections are established, the PRODUCER 4602 has more than one asynchronous plug shown in FIG. 8.

A command/transaction set (CTS) command, which is required for controlling the asynchronous connection, and a format of a response to the CTS command are described below with reference to FIG. 9. The CTS is one function control protocol (FCP) component and defines, for example, the structures of a command set, a command field, and a response field, which use the FCP, and the transaction rule when a control command and response data in response to the control command are transmitted. The FCP is a protocol in use for controlling each node connected via an IEEE1394 serial bus. The FCP can be applied to various commands that have been set in advance and command transactions. Commands and response data compliant to the FCP are transmitted and/or received by the use of an asynchronous packet defined in the IEEE1394.

In the asynchronous connection, opcode and operand fields in a command frame transmitted from the CONTROLLER 4601 to the PRODUCER 4602 or the CONSUMER 4603 have the same format as opcode and operand fields in a response frame transmitted from the PRODUCER 4602 or the CONSUMER 4603 to the CONTROLLER 4601.

Figure 9:
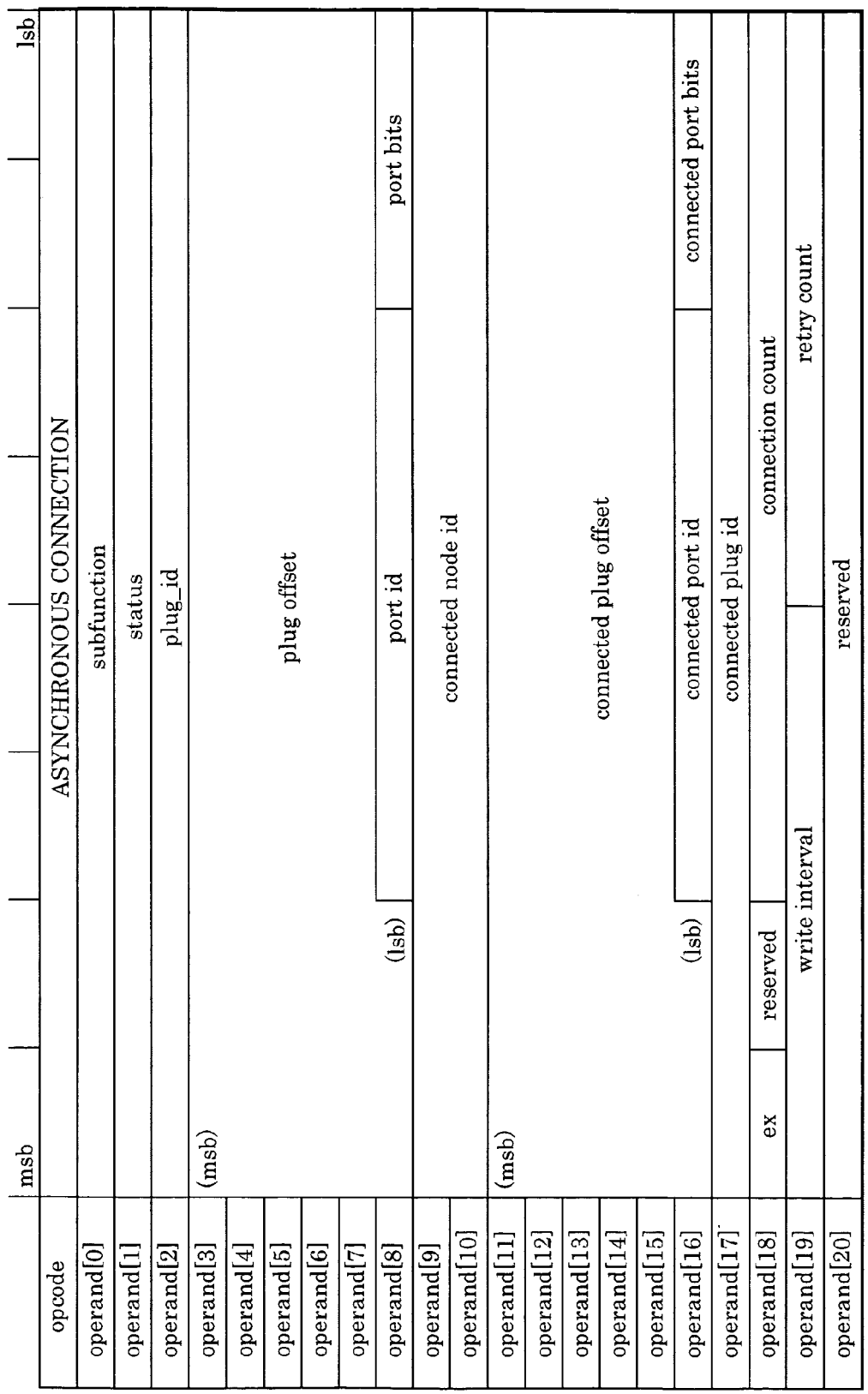
FIG. 9 illustrates a command/transaction set (CTS) command, which is required for controlling the asynchronous connection, and a format of a response to the CTS command.

Referring to FIG. 9, an opcode field indicates a type of the CTS command and has a code indicating that the corresponding command is a command for the asynchronous connection. A subfunction field (operand[0]) has a code specifying an operation performed by the PRODUCER 4602 or the CONSUMER 4603. For example, allocation of a plug resource or establishment/break of a connection is specified in the subfunction field.

A status field ([operand(1)] indicates a status of a command that has been executed. A predetermined code is set in the response frame and the status is notified to the CONTROLLER 4601. A plug id field ([operand(2)] indicates an asynchronous plug number used in the connection. An example of codes set in the plug id field is shown in FIG. 22.

A plug offset field (operand[3] to operand[8]) is 42-bit field. The plug offset field has an initial address of the asynchronous plug (that is, an address specifying the iAPR shown in FIG. 8).

A port id field (operand[8]) indicates which port in the asynchronous plug is selected. An example of codes set in the port id field is shown in FIG. 23. Referring to FIG. 23, consumer port corresponds to the iAPR shown in FIG. 8. Producer port [1] to producer port [14] correspond to oAPR[1] to oAPR[14] shown in FIG. 8.

A port bits field (operand[8]) indicates the capability of a port selected. An example of codes set in the port bits field is shown in FIG. 24.

A connection node id field (operand[9] to operand[10]) indicates the node ID of a destination with which the connection is established (that is, a connection node). The connection node id field indicates the node ID of the CONSUMER 4603 for the PRODUCER 4602 and indicates the node ID of the PRODUCER 4602 for the CONSUMER 4603. The CONTROLLER 4601 sets the node ID of the PRODUCER 4602 for the CONSUMER 4603 and the node ID of the CON- SUMER 4603 for the PRODUCER 4602, and notifies the set node IDs to the PRODUCER 4602 and the CONSUMER 4603.

A connected plug offset field (operand[11] to operand[16]) has an offset address specifying the asynchronous plug of the connection node. A connected port id field (operand[16]) has a port number of the connection node used in the connection.

A connected port bits field (operand[16]) has a code indicating the capability of a port of the connection node. A connected plug id field (operand[17]) has a code indicating a plug number of the connection node used in the connection.

An ex (exclusive) bit (operand[18]) specifies whether another CONTROLLER can access the port used in the connection. For example, when the PRODUCER 4602 or the CONSUMER 4603 receives a command frame for accessing the port with the ex bit being set to "1", the PRODUCER 4602 or the CONSUMER 4603 determines the node ID of the transmitter of the command. If the node ID of the transmitter is different from the node ID of the CONTROLLER 4601 with which the connection is established, the PRODUCER 4602 or the CONSUMER 4603 transmits a response frame that specifies Rejected for the command.

A connection count field (operand[18]) indicates how many PRODUCER ports the CONSUMER port is connected to. A write interval field (operand[19]) has a code indicating a minimum interval when the PRODUCER 4602 sequentially performs write transactions with the segment buffer of the CONSUMER 4603. A retry count field (operand[19]) has a retry count value, which is necessary when a serial bus transaction fails. The retry count value is set in the response frame from the CONSUMER 4603.

Process of Establishing Connection by Asynchronous Connection

Figure 10:
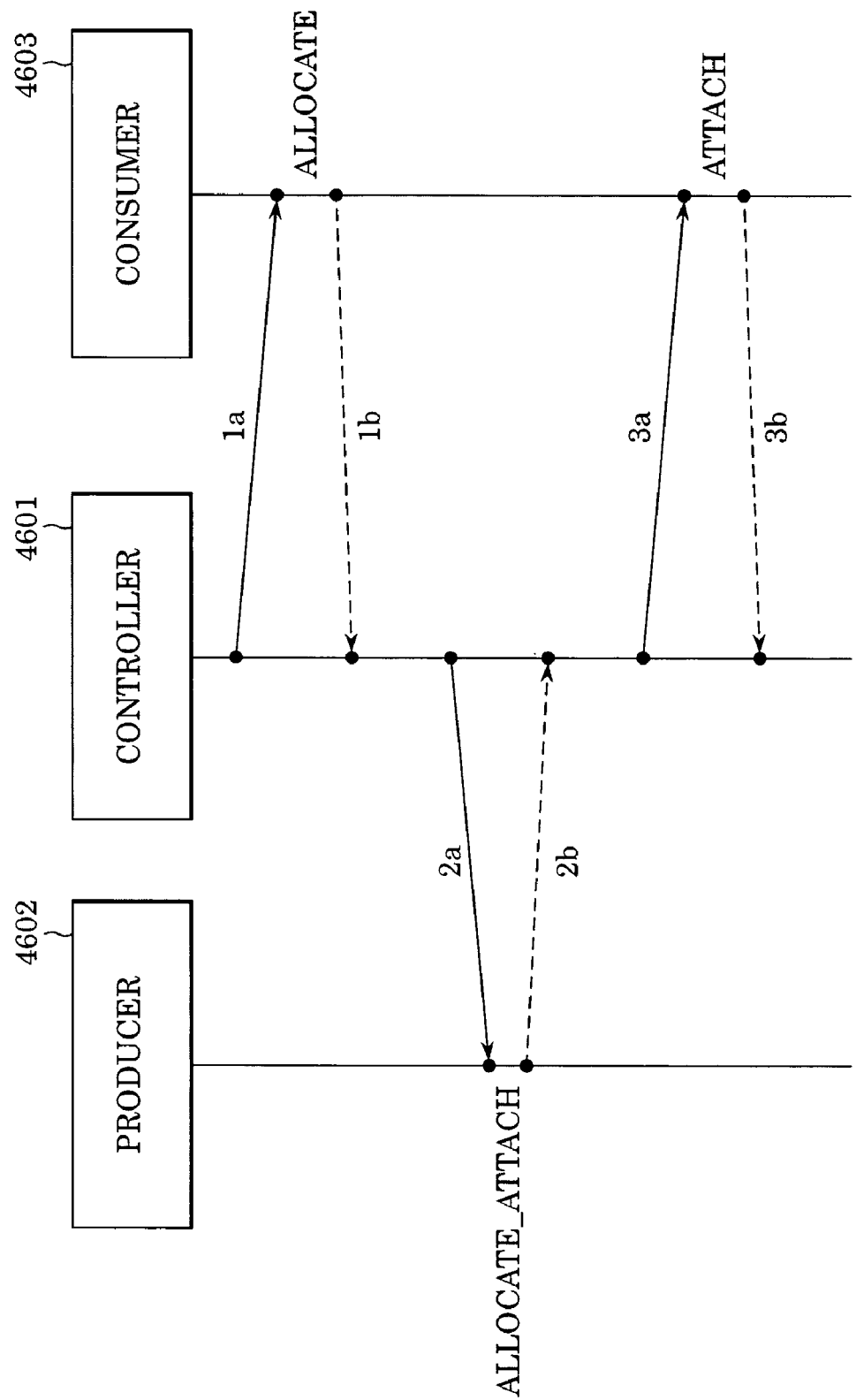
FIG. 10 illustrates a process of setting one connection used in the asynchronous connection.

FIG. 10 illustrates a process of setting one connection between the CONTROLLER 4601 and the 0th asynchronous plugs of the PRODUCER 4602 and the CONSUMER 4603. An offset address specifying the 0th asynchronous plug of the CONSUMER 4603 and that of the PRODUCER 4602 are "FFFFF0001800$_{16}$". The PRODUCER 4602 has a function of sequentially writing the transferred data in the Segment_Buffer of the CONSUMER 4603 from its initial address and does not support a multicast connection function.

The PRODUCER 4602 supports only the Segment_Buffer, of the CONSUMER 4603, having a fixed size. In the example shown in FIG. 10, the node IDs of the CONTROLLER 4601, the PRODUCER 4602, and the CONSUMER 4603 are 0, 1, and 2, respectively.

Referring to FIG. 10, solid-line arrows show the flows of command frames 1a, 2a, and 3a, and broken-line arrows show the flows of response frames 1b, 2b, and 3b. The command frames 1a, 2a, and 3a and the response frames 1b, 2b, and 3b have the same structure as the FCP frame and are set in the data fields of asynchronous packets.

The asynchronous packet including the command frames 1a, 2a, and 3a is subjected to a write transaction from the CONTROLLER 4601 to the CONSUMER 4603 or the PRODUCER 4602. The asynchronous packet including the response frames 1b, 2b, and 3b is subjected to a write transaction from the CONSUMER 4603 or the PRODUCER 4602 to the CONTROLLER 4601.

A ctype field of each of the command frames 1a, 2a, and 3a has a code indicating "Control". A subunit_type field and a subunit_ID field of each of the command frames 1a, 2a, and 3a have codes specifying a predetermined subunit in the CONSUMER 4603 or the PRODUCER 4602, which is the target.

A response field of each of the response frames 1b, 2b, and 3b has a code indicating whether the command is accepted. A case in which the command is accepted and "Accepted" is set is described here. A subunit_type field and a subunit_ID field of each of the response frames 1b, 2b, and 3b have the same codes as in the subunit_type field and the subunit_ID field of each of the command frames 1a, 2a, and 3a.

Referring to FIG. 10, the CONTROLLER 4601 first transmits an ALLOCATE command to the CONSUMER 4603 (shown by 1a in FIG. 10). Examples of codes set in the opcode and operand fields in the command frame of the ALLOCATE command are described next.

In the ALLOCATE command, the opcode field has a code "$26_{16}$" indicating that the ALLOCATE command is a command for the asynchronous connection. The subfunction field (operand[0]) has a code "$01_{16}$", of the ALLOCATE command, specifying the allocation of the resource.

The plug id field (operand[2]) has a code "$A0_{16}$" indicating that the 0th asynchronous plug is allocated. The port id field (operand[8]) has a port number "0" indicating the iAPR. The ex (exclusive) field (operand[18]) has a code "0" indicating that access from another CONTROLLER is allowed. "1" is set to all the bits in the remaining fields as dummy data. The command frame of the ALLOCATE command is set in the data field of the asynchronous packet and is written in a command register from the CONTROLLER 4601 to the CONSUMER 4603 in the write transaction. The ALLOCATE command is issued in this manner.

The CONSUMER 4603, which receives the above ALLOCATE command, transmits to the CONTROLLER 4601 an Accepted response indicating that the CONSUMER 4603 has accepted the ALLOCATE command (shown by 1b in FIG. 10). Examples of codes set in the opcode and operand fields in the response frame of the Accepted response are described next.

In the Accepted response, the opcode field has a code "$26_{16}$" indicating that the Accepted response is a response to a command for the asynchronous connection. The subfunction field (operand[0]) has a code "$01_{16}$" indicating that the Accepted response is a response to the ALLOCATE command. The status field (operand[1]) has a code "$02_{16}$" of a status FIXED indicating that the resource is allocated. The plug id field (operand[2]) has a code "$A0_{16}$" indicating that the 0th asynchronous plug is allocated. The plug offset field (operand[3] to operand[8]) has a code indicating an offset address of the 0th asynchronous plug of the CONSUMER 4603. The port id field (operand[8]) has a port number "0" indicating the iAPR.

The port bits field (operand[8]) has a code "$00_{16}$" indicating that only the sequential writing of the data in the Segment_Buffer of the CONSUMER 4603 from its initial address is supported and that the multicast connection function is not supported. The connection count field (operand [18]) has a code "$00_{16}$" indicating that the connection to the PRODUCER port is not established. The write interval field and the retry count field (operand[19]) have a code "$F_{16}$" indicating the dummy data. The same values as in the command frame of the ALLOCATE command are set in the remaining fields.

The above response frame is set in the data field of the asynchronous packet and is written in a response register from the CONSUMER 4603 to CONTROLLER 4601 in the write transaction. The response to ALLOCATE command is issued in this manner.

The CONTROLLER 4601, which receives the Accepted response to the ALLOCATE command from the CONSUMER 4603, transmits to the PRODUCER 4602 an ALLO- CATE_ATTACH command (shown by 2a in FIG. 10). Examples of codes set in the opcode and operand fields in the command frame of the ALLOCATE_ATTACH command are described next.

In the ALLOCATE_ATTACH command, the opcode field has a code "$26^{16}$" indicating that the ALLOCATE_ATTACH command is a command for the asynchronous connection. The subfunction field (operand[0]) has a code "$03_{16}$", of the ALLOCATE_ATTACH command, instructing the allocation of the resource and connection to the CONSUMER 4603.

The plug id field (operand[2]) has a code "$A0_{16}$" indicating that the 0th asynchronous plug is allocated. The port id field (operand[8]) has a port number "1" indicating the oAPR[1]. The connected node id field (operand[9] to operand[10]) has "$0002_{16}$" indicating the node ID of the CONSUMER 4603. The connected plug offset field (operand[11] to operand[16]) has a code indicating an offset address of the 0th asynchronous plug of the CONSUMER 4603, notified by the CONSUMER 4603.

The connected port id field (operand[16]) has a port number "0" indicating the iAPR. The connected port bits field (operand[16]) has a code "$00_{16}$" indicating the reception capability notified by the CONSUMER 4603. The connected plug id field (operand[17]) has a code "$A0_{16}$" indicating that the connection with the 0th asynchronous plug of the CONSUMER 4603 is to be established. The ex (exclusive) field (operand[18]) has a code "0" indicating that access from another CONTROLLER is allowed. "1" is set to all the bits in the remaining fields as the dummy data.

The command frame of the ALLOCATE_ATTACH command is set in the data field of the asynchronous packet and is written in a command register from the CONTROLLER 4601 to the PRODUCER 4602 in the write transaction. The ALLOCATE_ATTACH command is issued in this manner.

The PRODUCER 4602, which receives the above ALLOCATE_ATTACH command, transmits to the CONTROLLER 4601 an Accepted response indicating that the PRODUCER 4602 has accepted the ALLOCATE_ATTACH command (shown by 2b in FIG. 10). Examples of codes set in the opcode and operand fields in the response frame of the Accepted response are described next.

In the Accepted response, the opcode field has a code "$26_{16}$" indicating that the Accepted response is a response to a command for the asynchronous connection. The subfunction field (operand[0]) has a code "$03_{16}$" indicating that the Accepted response is a response to the ALLOCATE_ATTACH command.

The status field (operand[1]) has a code "$03_{16}$" of a status ACTIVE indicating that the specified port is active. The plug id field (operand[2]) has a code "$A0_{16}$" indicating that the 0th asynchronous plug is allocated. The plug offset field (operand [3] to operand[8]) has a code indicating an offset address of the 0th asynchronous plug of the PRODUCER 4602. The port id field (operand[8]) has a port number "1" indicating the oAPR[1].

The port bits field (operand[8]) has a code "$00_2$" indicating that the specified port of the PRODUCER 4602 supports only the data transfer to the Segment_Buffer having a fixed size. The same values as in the command frame of the ALLOCATE_ATTACH command are set in the remaining fields.

The above response frame is set in the data field of the asynchronous packet and is written in a response register from the PRODUCER 4602 to CONTROLLER 4601 in the write transaction. The response to ALLOCATE_ATTACH command is issued in this manner.

The CONTROLLER 4601, which receives the Accepted response to the ALLOCATE_ATTACH command from the PRODUCER 4602, transmits to the CONSUMER 4603 an ATTACH command (shown by 3a in FIG. 10). Examples of codes set in the opcode and operand fields in the command frame of the ATTACH command are described next.

In the ATTACH command, the opcode field has a code "$26_{16}$" indicating that the ATTACH command is a command for the asynchronous connection. The subfunction field (operand[0]) has a code "$02_{16}$", of the ATTACH command, instructing connection to the PRODUCER 4602. The plug id field (operand[2]) has a code "$A0_{16}$" indicating the 0th asynchronous plug, as in the issuance of the ALLOCATE command. The plug offset field (operand[3] to operand[8]) has a code indicating the plug offset of the CONSUMER 4603, which is notified in the response to the ALLOCATE command.

The port id field (operand[8]) has a port number "0" indicating the iAPR, as in the issuance of the ALLOCATE command. The port bits field (operand[8]) has a code "$00_2$" indicating the transmission capability of the CONSUMER 4603, which is notified in the response to the ALLOCATE command.

The connected node id field (operand[9] to operand[10]) has "$0001_{16}$" indicating the node ID of the PRODUCER 4602. The connected plug offset field (operand[11] to operand[16]) has a code indicating an offset address of the 0th asynchronous plug of the PRODUCER 4602, notified by the PRODUCER 4602.

The connected port id field (operand[16]) has a port number "1" indicating the oAPR[1]. The connected port bits field (operand[16]) has a code "$00_{16}$" indicating the transmission capability notified by the PRODUCER 4602. The connected plug id field (operand[17]) has a code "$A0_{16}$" indicating that the connection with the 0th asynchronous plug of the PRODUCER 4602 is to be established.

The ex (exclusive) field (operand[18]) has a code "0" indicating that access from another CONTROLLER is allowed. "1" is set to all the bits in the remaining fields as the dummy data. The command frame of the ATTACH command is set in the data field of the asynchronous packet and is written in a command register from the CONTROLLER 4601 to the CONSUMER 4603 in the write transaction. The ATTACH command is issued in this manner.

The CONSUMER 4603, which receives the above ATTACH command, transmits to the CONTROLLER 4601 an Accepted response indicating that the CONSUMER 4603 has accepted the ATTACH command (shown by 3b in FIG. 10). Examples of codes set in the opcode and operand fields in the response frame of the Accepted response are described next.

In the Accepted response, the opcode field has a code "$26_{16}$" indicating that the Accepted response is a response to a command for the asynchronous connection. The subfunction field (operand[0]) has a code "$02_{16}$" indicating that the Accepted response is a response to the ATTACH command.

The status field (operand[1]) has a code "$03_{16}$" of a status ACTIVE indicating that the specified port is active. The same values as in the ATTACH command are set in the plug id, plug offset, port id, and port bits fields (operand[2] to operand[8]) after it is confirmed that the value of each field in the ATTACH command coincides with the value notified to the CONTROLLER 4601 in the response to the ALLOCATE command described above. The same values as in the command frame of the ATTACH command are set in the remaining fields.

The above response frame is set in the data field of the asynchronous packet and is written in a response register from the CONSUMER 4603 to CONTROLLER 4601 in the write transaction. The response to ATTACH command is issued in this manner.

The transmission of the command frames and the response frames described above to the CONSUMER 4603 or the PRODUCER 4602 notifies the CONSUMER 4603 and the PRODUCER 4602 of the corresponding node ID, plug ID, plug offset, port ID of the connection node, thus establishing one connection between the CONSUMER 4603 and the PRODUCER 4602.

Process of Transferring Data by Asynchronous Connection

A process of transferring data between the PRODUCER 4602 and the CONSUMER 4603 after the connection is established is described below. After the connection s established in the manner described above, the CONSUMER 4603 uses a Lock transaction to notify the oAPR of the PRODUCER 4602 of the size of the Segment_Buffer of the CONSUMER 4603 and instructs start of the data transfer.

The PRODUCER 4602 instructed to start the data transfer writes frames (for example, a predetermined data file or a file list) of the PRODUCER 4602 in the Segment_Buffer of the CONSUMER 4603 in the write transaction. When the data size of the frame is larger than the size of the Segment_Buffer, the frame is separated into segments each having the size of the Segment_Buffer and the segments are transferred. After the PRODUCER 4602 transfers the final data of the frame or the segments, the PRODUCER 4602 uses the Lock transaction to notify the iAPR of the CONSUMER 4603 of the size of the transferred data and whether the subsequent segment data exists or whether the transfer of the frame is completed.

The CONSUMER 4603, which receives the notification from the PRODUCER 4602, starts processing of the data written in the Segment_Buffer. When the processing is completed, the CONSUMER 4603 notifies the oAPR of the PRODUCER 4602 of the size of the Segment_Buffer and instructs start of the transmission of the subsequent segment data. The CONSUMER 4603 repeats this operation until the transfer of one frame is completed.

Figure 11:
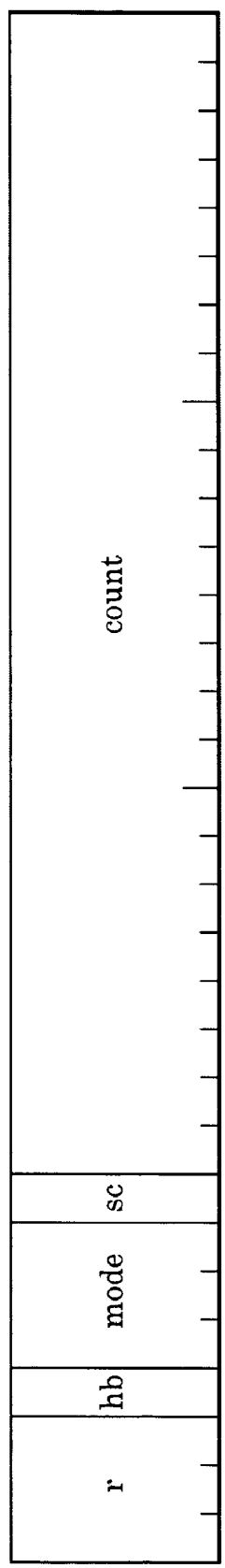
FIG. 11 shows the format of an iAPR of a CONSUMER in the asynchronous connection.

FIG. 11 shows a format of iAPR of the CONSUMER 4603. After the PRODUCER 4602 transmits the segment data, the PRODUCER 4602 uses the Lock transaction to update the register in order to notify the completion of the transmission. Referring to FIG. 11, an r (reserved) field is for future expansion. An hb (heartbeat) field is for handshaking to prevent a timeout from occurring when the data communication is not performed within a predetermined time period. A mode field is for notification of the state of the transmitted data or the connection state. An example of codes set in the mode field is shown in FIG. 25. An sc (segment count) field is for checking to correctly perform the data transfer. A count field is for notification of the byte size of the transmitted segment data.

Figure 12:
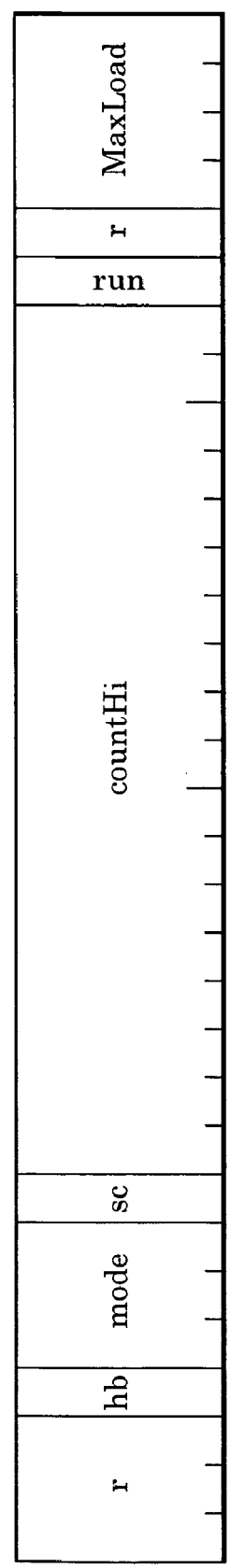
FIG. 12 shows the format of an oAPR of a PRODUCER in the asynchronous connection.

FIG. 12 shows a format of the oAPR of the PRODUCER 4602. After the Segment_Buffer for data reception is ready, the CONSUMER 4603 uses the Lock transaction to update the register and requests transmission of the segment data. Referring to FIG. 12, an r (reserved) field is for future expansion. An hb (heartbeat) field is for handshaking to prevent a timeout from occurring when the data communication is not performed within a predetermined time period. A mode field is for notification of the transmission request or the connection state. An example of codes set in the mode field is shown in FIG. 26.

An sc (segment count) field is for checking to correctly perform the data transfer. A countHi field is for notification of the byte size of the Segment_Buffer. A 24-bit value given by adding six-bit zeros to the lower side of the value of the 18-bit countHi field is the actual size of the Segment_Buffer.

A run field is for control of access from the PRODUCER 4602 to the CONSUMER 4603. When the run field is set to "0", the PRODUCER 4602 cannot perform the Lock transaction with the iAPR of the PRODUCER 4602 and the write transaction with the Segment_Buffer. A maxLoad field indicates a maximum size of the payload that can be received by the CONSUMER 4603 in one write transaction. The size is given by the following equation.

$$payloadSize = 2^{(maxLoad+1)}$$

A process of transferring data between the PRODUCER 4602 and the CONSUMER 4603 is described in detail below. The CONSUMER 4603 has a Segment_Buffer of 32 KB, and a maximum size of the payload received by the CONSUMER 4603 is 1 KB. The PRODUCER 4602 transfers a frame of 50 KB (for example, a predetermined data file or a file list) to the CONSUMER 4603. The initial values of all the bits in the iAPR and the oAPR described above are set to "0".

First, the CONSUMER 4603 uses the Lock transaction to update the oAPR of the PRODUCER 4602. Setting the mode field of the oAPR to "SEND" requests start of the transfer to the PRODUCER 4602. The countHi field of the oAPR indicates that the segment buffer of the CONSUMER 4603 has a size of 32 KB. The maxLoad field indicates that the payload has a maximum size of 1 KB. Since the run field is updated to one, the PRODUCER 4602 is allowed to perform transactions with the CONSUMER 4603.

The PRODUCER 4602 whose oAPR is updated uses the write transaction to start the transmission of the segment data to the Segment_Buffer of the CONSUMER 4603. The PRODUCER 4602 sequentially writes the data in its own frame of 50 KB in the Segment_Buffer of the CONSUMER 4603 from its initial address by 1 KB in the write transaction. Each time the PRODUCER 4602 transmits a write packet, the offset address used for the write transaction is incremented by 1 KB. After the PRODUCER 4602 transmits the segment data of 32 KB, the PRODUCER 4602 updates the iAPR of the CONSUMER 4603 to notify the CONSUMER 4603 of the completion of the transmission of the segment data. Setting the mode field of the iAPR to "MORE" notifies the CONSUMER 4603 that the subsequent segment data is to be transmitted. The same value as in the sc field of the oAPR updated by the CONSUMER 4603 is set in the sc field. Data notifying the CONSUMER 4603 that data of 32 KB is transmitted is set in the count field.

After the iAPR is updated, the CONSUMER 4603 compares the value of the sc field of the oAPR, which was previously updated, with the value of the sc field of the iAPR, which has been updated here. If both the sc fields have the same value, the CONSUMER 4603 determines that the data has been correctly transmitted and starts to process the segment data. After the processing of the segment data is completed and the Segment_Buffer is active, the CONSUMER 4603 updates the oAPR of the PRODUCER 4602 again. Transmission of a new segment is requested by inverting the value of the sc field. The remaining fields have the same values as those that were previously set.

The PRODUCER 4602 whose oAPR is updated uses the write transaction to start the transmission of the subsequent segment data to the Segment_Buffer of the CONSUMER 4603. The PRODUCER 4602 sequentially writes the data subsequent to the transmitted 32-KB data in the Segment_Buffer of the CONSUMER 4603 from its initial address by 1 KB in the write transaction.

Each time the PRODUCER 4602 transmits a write packet, the offset address used for the write transaction is incremented by 1 KB. After the PRODUCER 4602 transmits the segment data of 18 KB (=50 KB−32 KB), the PRODUCER 4602 updates the iAPR of the CONSUMER 4603 to notify the CONSUMER 4603 of the completion of the transmission of the segment data.

Setting the mode field of the iAPR to "LAST" notifies the CONSUMER 4603 that the transmission of all the data in this frame is completed. The same value as in the sc field of the oAPR updated by the CONSUMER 4603 is set in the sc field. Data notifying the CONSUMER 4603 that data of 18 KB is transmitted is set in the count field. The CONSUMER 4603 whose iAPR is updated processes the segment data after comparing the values of the sc fields. After the processing of the segment data is completed, the CONSUMER 4603 updates the oAPR of the PRODUCER 4602.

The data corresponding to one frame is transmitted from the PRODUCER 4602 to the CONSUMER 4603 in the manner described above. When the PRODUCER 4602 has other frames to be transferred, the same process is repeated. After the transfer of all the frames is completed, the CONTROLLER 4601 breaks the connection established between the PRODUCER 4602 and the CONSUMER 4603 if required.

Process of Breaking Connection in Asynchronous Connection

Figure 13:
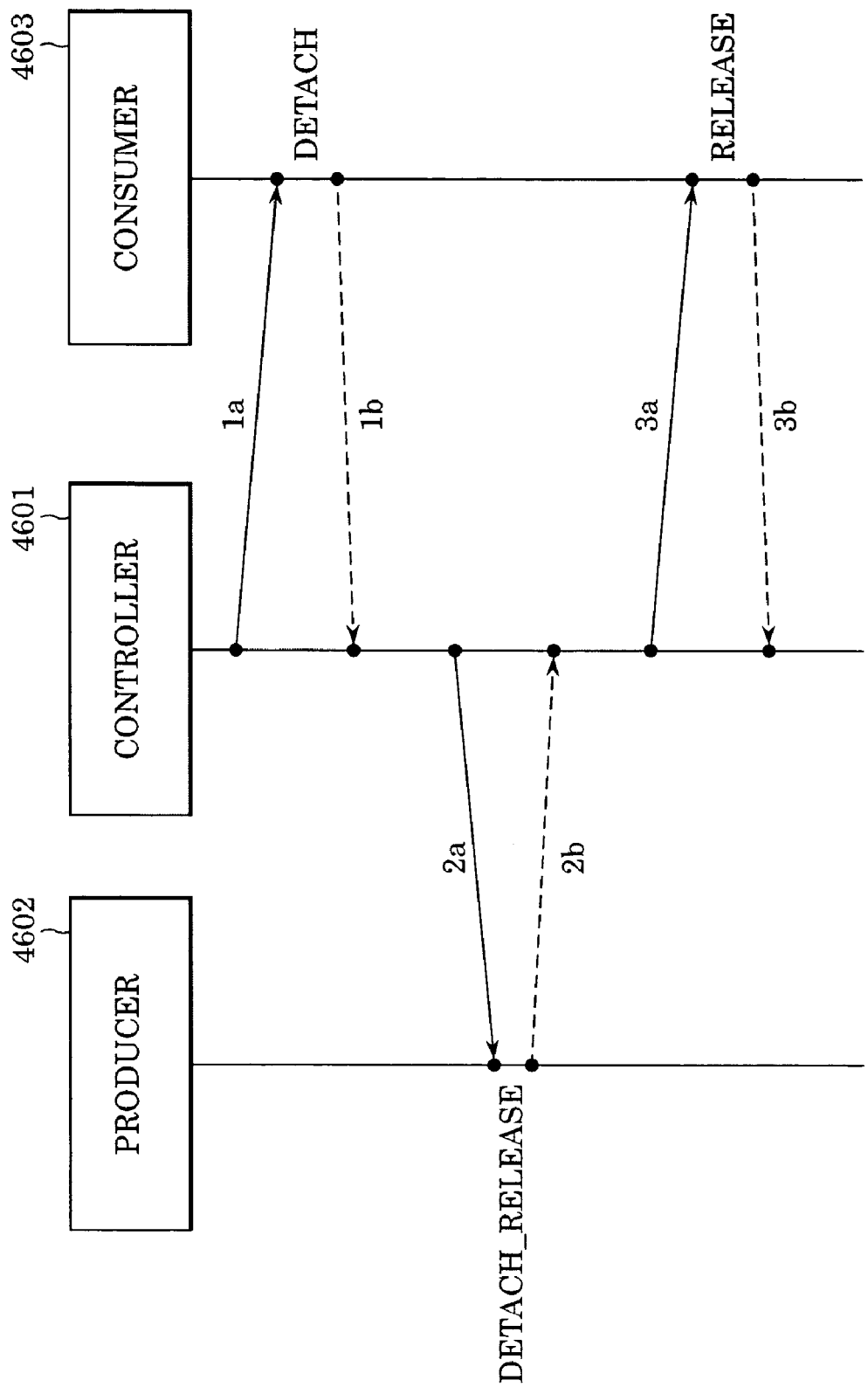
FIG. 13 illustrates a process of breaking a connection used in the asynchronous connection.

FIG. 13 illustrates a process of breaking a connection. Referring to FIG. 13, solid-line arrows show the flows of command frames 1a, 2a, and 3a, and broken-line arrows show the flows of response frames 1b, 2b, and 3b. The CONTROLLER 4601 first transmits a DETACH command to the CONSUMER 4603 (shown by 1a in FIG. 13). Examples of codes set in the opcode and operand fields in the command frame of the DETACH command are described next.

In the DETACH command, the opcode field has a code "$26_{16}$" indicating that the DETACH command is a command for the asynchronous connection. The subfunction field (operand[0]) has a code "$06_{16}$", of the DETACH command, instructing breaking of the connection. The plug id field (operand[2]) has a code "$A0_{16}$" indicating the 0th asynchronous plug, as in the issuance of the ATTACH command. The port id field (operand[8]) has a port number "0" indicating the iAPR, as in the issuance of the ATTACH command. The ex (exclusive) field (operand[18]) has a code "0" indicating that access from another CONTROLLER is allowed. "1" is set to all the bits in the remaining fields as dummy data.

The command frame of the DETACH command is set in the data field of the asynchronous packet and is written in a command register from the CONTROLLER 4601 to the CONSUMER 4603 in the write transaction. The DETACH command is issued in this manner.

The CONSUMER 4603, which receives the above DETACH command, transmits to the CONTROLLER 4601 an Accepted response indicating that the CONSUMER 4603 has accepted the DETACH command (shown by 1b in FIG. 13). Examples of codes set in the opcode and operand fields in the response frame of the Accepted response are described next.

In the response frame, the opcode field has a code "$26_{16}$" indicating that the Accepted response is a response to a command for the asynchronous connection. The subfunction field (operand[0]) has a code "$06_{16}$" indicating that the Accepted response is a response to the DETACH command. The status field (operand[1]) has a code "$04_{16}$" of a status INACTIVE indicating that the specified port is inactive. The plug id field (operand[2]) has a plug number specified in the command frame. The plug offset field (operand[3]) to operand[8]) has a code indicating an offset address of the asynchronous plug specified in the command frame.

The port id field (operand[8]) has a port number specified in the command frame. The port bits field (operand[8]) has a code indicating the capability of the port specified in the command frame. The connected node id, connected plug offset, connected port id, connected port bits, and connected plug id fields (operand[9] to operand[17]) has the node ID of the PRODUCER 4602 with which the connection is established, an offset address of the asynchronous plug, a port number, the capability of the port, and a plug number, respectively. The connection count field (operand[18]) has a value "0" given by subtracting "1" from the value of the connection count field before the DETACH command is received. The same values as in the command frame of the DETACH command are set in the remaining fields.

The above response frame is set in the data field of the asynchronous packet and is written in a response register from the CONSUMER 4603 to CONTROLLER 4601 in the write transaction. The response to DETACH command is issued in this manner.

The CONTROLLER 4601, which receives the Accepted response to the DETACH command from the CONSUMER 4603, transmits to the PRODUCER 4602 a DETACH_RELEASE command (shown by 2a in FIG. 13). Examples of codes set in the opcode and operand fields in the command frame of the DETACH_RELEASE command are described next.

In this command frame, the opcode field has a code "$26_{16}$" indicating that the DETACH_RELEASE command is a command for the asynchronous connection. The subfunction field (operand[0]) has a code "$07_{16}$", of the DETACH_RELEASE command, instructing breaking of the connection and release of the resource. The plug id field (operand[2]) has a code "$A0_{16}$" indicating the 0th asynchronous plug, as in the issuance of the ALLOCATE_ATTACH command.

The PRODUCER 4602, which receives the above DETACH_RELEASE command, transmits to the CONTROLLER 4601 an Accepted response indicating that the PRODUCER 4602 has accepted the DETACH_RELEASE command (shown by 2b in FIG. 13). Examples of codes set in the opcode and operand fields in the response frame of the Accepted response are described next.

In this response frame, the opcode field has a code "$26_{16}$" indicating that the Accepted response is a response to a command for the asynchronous connection. The subfunction field (operand[0]) has a code "$07_{16}$" indicating that the Accepted response is a response to the DETACH_RELEASE command. The status field (operand[1]) has a code "$01_{16}$" of a status FREE indicating that the specified port is not used. The same values as in the command frame of the DETACH_RELEASE command are set in the remaining fields.

The above response frame is set in the data field of the asynchronous packet and is written in a response register from the PRODUCER 4602 to CONTROLLER 4601 in the write transaction. The response to DETACH_RELEASE command is issued in this manner.

The CONTROLLER 4601, which receives the Accepted response to the DETACH_RELEASE command from the PRODUCER 4602, transmits to the CONSUMER 4603 a RELEASE command (shown by 3a in FIG. 13). Examples of codes set in the opcode and operand fields in the command frame of the RELEASE command are described next.

In this command frame, the opcode field has a code "$26_{16}$" indicating that the RELEASE command is a command for the asynchronous connection. The subfunction field (operand[0])

has a code "$05_{16}$", of the RELEASE command, instructing release of the resource. The plug id field (operand[2]) has a code "$A0_{16}$" indicating the 0th asynchronous plug, as in the issuance of the ALLOCATE command. The port id field (operand[8]) has a port number "0" indicating the iAPR, as in the issuance of the ALLOCATE command. The ex (exclusive) field (operand[18]) has a code "0" indicating that access from another CONTROLLER is allowed. "1" is set to all the bits in the remaining fields as the dummy data.

The command frame of the RELEASE command is set in the data field of the asynchronous packet and is written in a command register from the CONTROLLER 4601 to the CONSUMER 4603 in the write transaction. The RELEASE command is issued in this manner.

The CONSUMER 4603, which receives the above RELEASE command, transmits to the CONTROLLER 4601 an Accepted response indicating that the CONSUMER 4603 has accepted the RELEASE command (shown by 3b in FIG. 13). Examples of codes set in the opcode and operand fields in the response frame of the Accepted response are described next.

In the response frame, the opcode field has a code "$26_{16}$" indicating that the Accepted response is a response to a command for the asynchronous connection. The subfunction field (operand[0]) has a code "$05_{16}$" indicating that the Accepted response is a response to the RELEASE command. The status field (operand[1]) has a code "$01_{16}$" of a status FREE indicating that the specified port is not used. The same values as in the command frame of the RELEASE command are set in the remaining fields.

The above response frame is set in the data field of the asynchronous packet and is written in a response register from the CONSUMER 4603 to CONTROLLER 4601 in the write transaction. The response to RELEASE command is issued in this manner.

The transmission of the command frames and the response frames described above to the CONSUMER 4603 or the PRODUCER 4602 breaks one connection established between the CONSUMER 4603 and the PRODUCER 4602.

Method of Transferring Position Information on Tape

As described above, after the series of initialization operation subsequent to the bus reset is completed, the camcorder 101 uses, for example, the asynchronous connection described above to transmit to the PC 103 the index image and the data, such as the time code and the ATN, associated with the index image. The camcorder 101 serves as both the CONTROLLER node and the PRODUCER node in the asynchronous connection to transmit the index image and the data, such as the time code and the ATN, associated with the index image. The PC 103 serves as the CONSUMER node to receive the index image and the data, such as the time code and the ATN, associated with the index image. In this case, the camcorder 101 may be structured so as to transmit the ID information on the video cassette or the date and time information, in addition to the above index image and data.

Alternatively, after the series of initialization operation subsequent to the bus reset is completed, the PC 103 may serve as both the CONTROLLER node and the CONSUMER node in the asynchronous connection. In this case, the camcorder 101 serves as the PRODUCER node and transmits the index image and the data, such as the time code and the ATN, associated with the index image under the control of the PC 103. The PC 103 serves as the CONSUMER node and receives the index image and the data, such as the time code and the ATN, associated with the index image. Also in this case, the camcorder 101 may be structured so as to transmit the ID information on the video cassette or the date and time information, in addition to the above index image and data.

The PC 103 records the received index image and the data, such as the time code and the ATN, associated with the index image in the HD in the PC 103. When the ID information on the video cassette or the date and time information is also received, the index image is associated with the ID information on the video cassette and the date and time information to be recorded in the HD.

Although, as described above, the asynchronous connection is used to transfer the index image, to transfer the tape position information associated with the index image, or to transfer the ID information on the video cassette and the date and time information associated with the index image in this embodiment, IPv4 over IEEE1394 (RFC2734, IETF) may be used to transfer the above information. In this case, a file transfer protocol, such as a file transfer protocol (FTP) or a hypertext transfer protocol (HTTP), is used as a higher-layer protocol.

An operation when the IPv4 over IEEE1394 is used is described below with reference to FIG. 5. If a bus reset occurs, the camcorder 101 and the PC 103 performs an initial reset operation. When the initial reset operation is completed, an FTP server is up and run in, for example, the PC 103. The camcorder 101 logs into the FTP server. For example, a one-time password is used in the login process. The camcorder 101, which logs into the FTP server, uses a PUT command to transfer, for example, the index image file, the tape position information associated with the index image, or the ID information on the video cassette and the date and time information associated with the index image. After the transfer process is performed a number of times corresponding to the number of the index image files, the camcorder 101 uses a QUIT command to perform a logout process.

Although the FTP server is up and run in the PC 103 in the above process, an FTP server may be up and run in the camcorder 101. A process in which the FTP server is up and run in the camcorder 101 is described below with reference to FIG. 5, as in the above case. If a bus reset occurs, the camcorder 101 and the PC 103 performs the initial reset operation. When the initial reset operation is completed, an FTP server is up and run in the camcorder 101. In the PC 103, an FTP application (FTP client) is loaded on the memory in the PC 103 and the PC 103 logs into the FTP server in the camcorder 101. For example, a one-time password is used in the login process. The PC 103, which logs into the FTP server, uses a GET command to transfer, for example, the index image file, the tape position information associated with the index image, or the ID information on the video cassette and the date and time information associated with the index image. After the transfer process is performed a number of times corresponding to the number of the index image files, the camcorder 101 uses a QUIT command to perform a logout process.

Although the FTP is used as the higher-layer protocol of the IPv4 over IEEE 1394 in the embodiment described above, any protocol, such as trivial file transfer protocol (TFTP), the HTTP, or simple mail transfer protocol (SMTP), may be used as long as the protocol is capable of data transfer. Any protocol, such as SBP-2, SBP-3, or direct printing protocol (DPP), may be used as the higher-layer protocol compliant with the IEEE 1394 as long as the protocol is capable of data transfer by the use of an asynchronous mode. Although the IEEE 1394 is used as the protocol for a lower layer including a network access layer in the embodiment described above, any protocol may be used as long as the protocol is a lower-layer protocol capable of detecting whether logical connection to the network is established. For example, Ethernet (registered trademark), IEEE 802.3, IEEE 802.4, IEEE 802.5, IEEE 802.11, universal serial bus (USB), Bluetooth, or ultra wide band (UWB) may be used as the lower-layer protocol.

Structure of Index File

The index image is recorded in the removable recording medium 30 in a format compliant with, for example, an image file format standard for a digital still camera (hereinafter referred to as an exchangeable image file format (Exif) standard) standardized by Japan Electronic Industry Development Association (JEIDA). The Exif standard defines two data file formats, that is, an uncompressed data file format and a compressed data file format. The uncompressed data file format is compatible with a tagged image file format (TIFF) Rev. 6.0, whereas the compressed data file format is compliant with a joint photographic experts group (JPEG) format.

Figure 14:
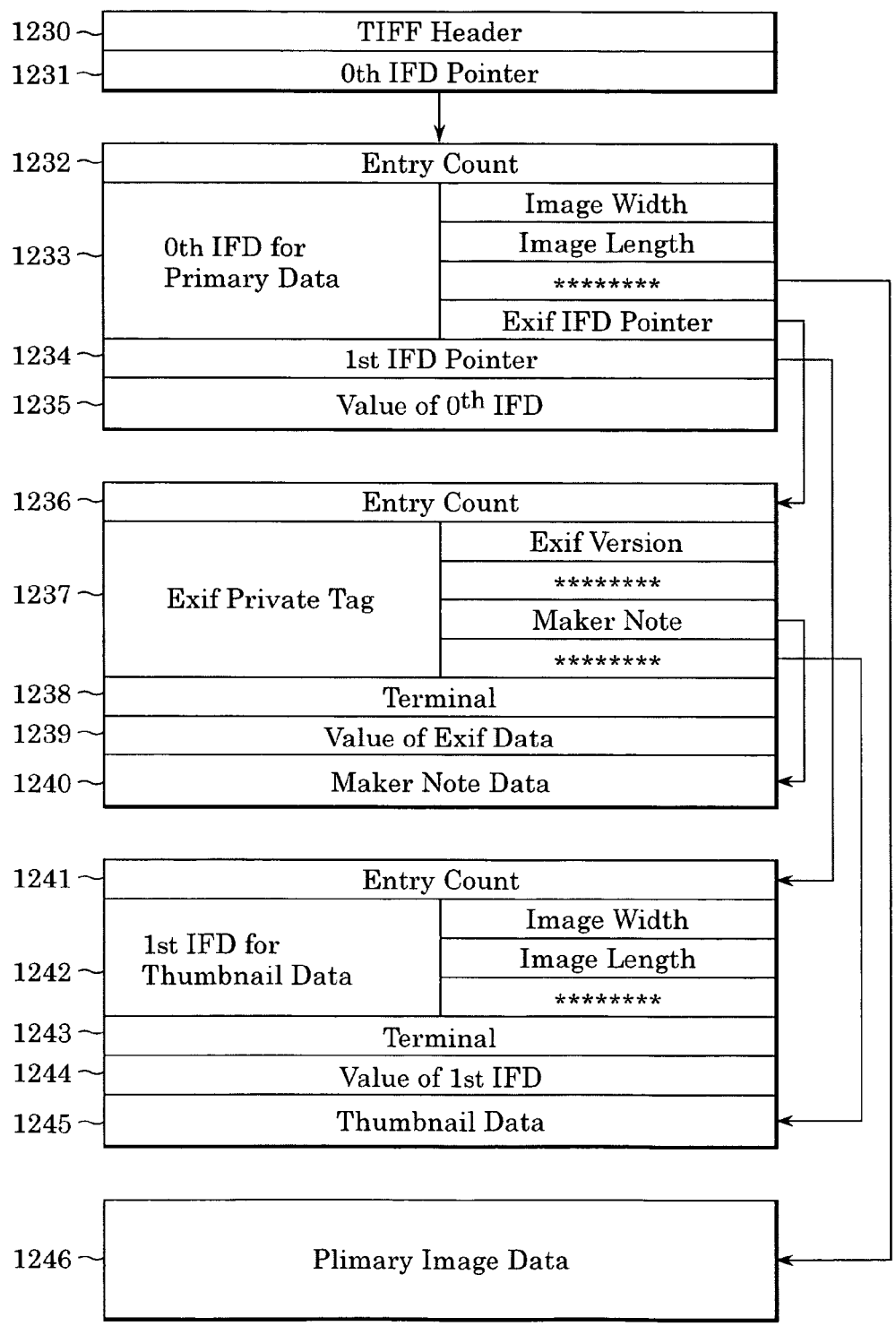
FIG. 14 shows the structure of an uncompressed data file in an Exif format.

FIG. 14 shows a file format in use for the uncompressed data. Image data (primary image data) is recorded in a RGB or $YC_rC_b$ format. Recording a thumbnail image in the file is recommended. The thumbnail image is recorded in the RGB or $HC_rC_b$ format, independent of the main image data. Two image file directories (IFDs) can be described in one file. An IFD described first in the file is called a "0th IFD". The 0th IFD has information concerning the primary image described therein. An IFD subsequent to the 0th IFD is called a "1st IFD". The 1st IFD has information concerning the thumbnail image described therein.

Referring to FIG. 14, "0th IFD pointer" 1231 is described subsequent to a header 1230. The "0th IFD pointer" 1231 indicates an initial address of the 0th IFD. A code of an entry count 1232 is described subsequent to the "0th IFD pointer" 1231. An IFD ("0th IFD for primary data" 1233) corresponding to the primary image is described subsequent to the code of the entry count 1232. The "0th IFD for primary data" 1233 includes the width of the image, the height of the image, and an Exif IFD pointer.

A "1st IFD pointer" 1234 is described subsequent to the "0th IFD for primary data" 1233. Specific data concerning the 0th IFD (a "value of 0th IFD" 1235) is described subsequent to the "1st IFD pointer" 1234. When the 1st IFD does not exit in the file, a termination code (terminal) is described in place of the "1st IFD pointer" 1234.

The "value of 0th IFD" 1235 is followed by a code of an entry count 1236 and an "Exif private tag" 1237. The "Exif private tag" 1237 includes the version information on the Exif and a maker note. Information specific to a vendor can be described in a maker note area. The maker note area may include information, such as the ATN, the timecode, the ID information on the video cassette, and the date and time information, associated with the index image.

A terminal 1238 is described subsequent to the "Exif private tag" 1237. "Value of Exif data" 1239 and maker note data 1240 are described subsequent to the terminal 1238. Subsequent to the maker note data 1240, a code of an entry count 1241 and an IFD corresponding to the thumbnail image ("1st IFD for thumbnail data" 1242) are described. The "1st IFD for thumbnail data" 1242 includes the width of the image and the height of the image. Subsequent to the "1st IFD for thumbnail data" 1242, a terminal 1243, "value of 1st IFD" 1244, and thumbnail data 1245 are described. Primary image data 1246 is described subsequent to the thumbnail data 1245.

Figure 15:
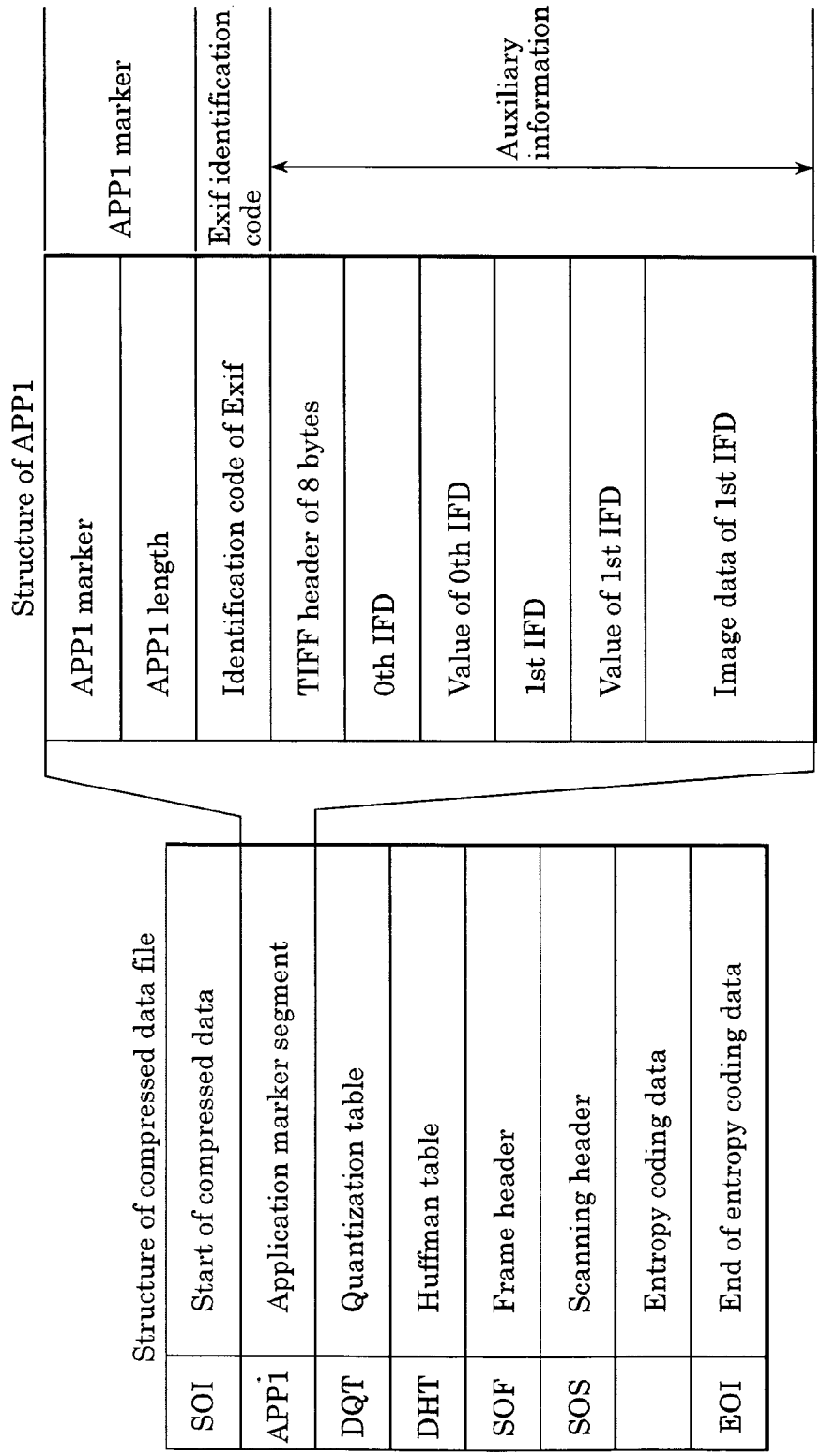
FIG. 15 shows the structure of a compressed data file in the Exif format.

FIG. 15 shows the structure of a compressed data file. A start of image (SOI) marker indicating the start of the file, an application marker segment (APP1), a quantization table (DQT), a Huffman table (DHT), a frame header (SOF), a scanning header (SOS), an entropy coding data, and an entropy coding data end code (EOI) are sequentially described in the compressed data file. The APP1 includes an APP1 marker, an Exif identification code, and auxiliary information. The auxiliary information has a structure of TIFF including a header. Two IFDs (a 0th IFD and a 1st IFD) are recorded in the auxiliary information.

Figure 16:
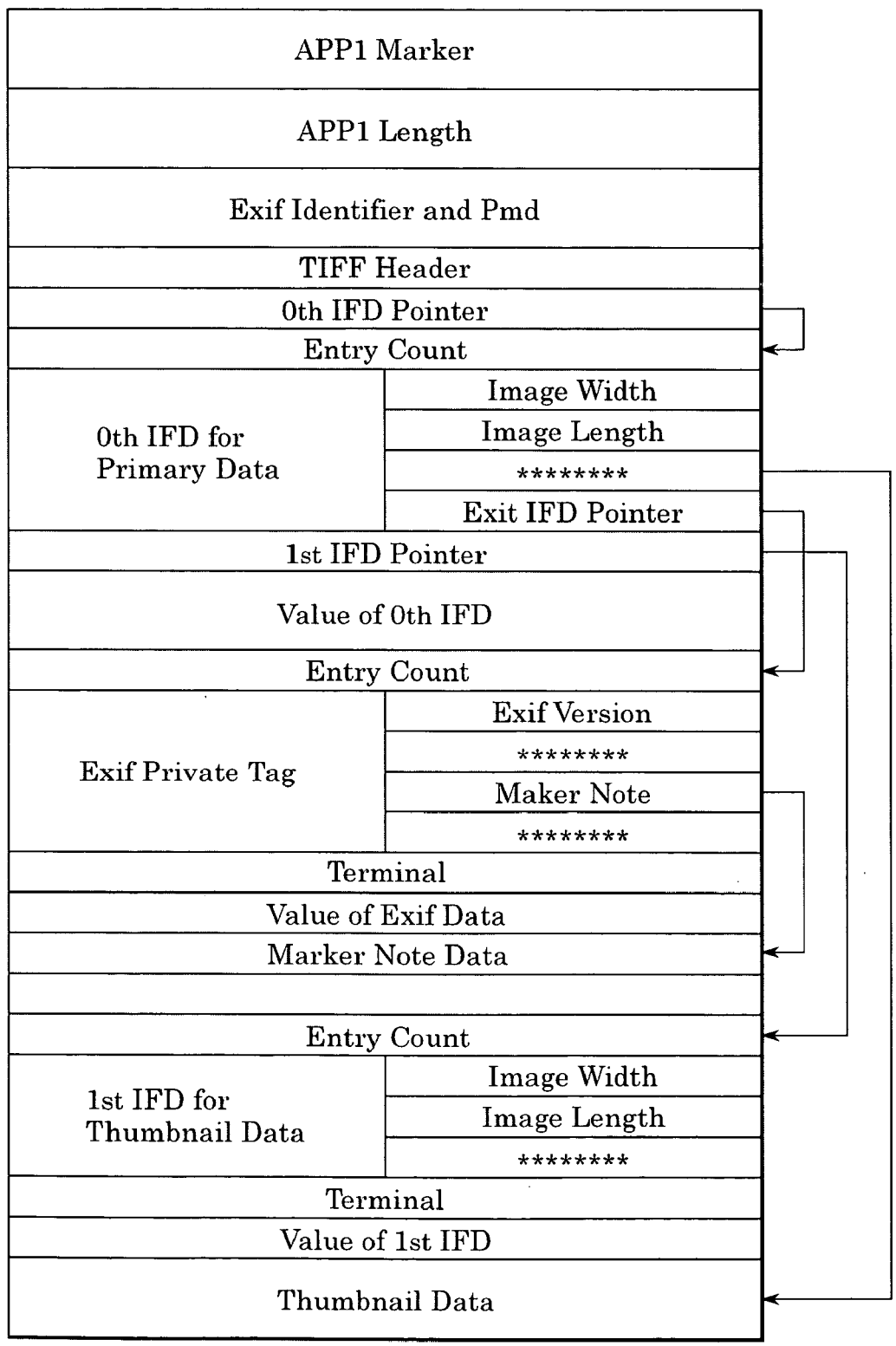
FIG. 16 shows a basic structure of a JPEG compressed data file in an APP1.

FIG. 16 shows a basic structure of a JPEG compressed data file in the APP1. Referring to FIG. 16, the APP1 includes the structure (TIFF structure) of the uncompressed data file described above with reference to FIG. 14.

Information stored in the maker note area is described below with reference to FIG. 27. According to this embodiment, the information including the ATN, the timecode, the ID information on the video cassette, and the date and time information, which are associated with the index image, are stored in the maker note area. Each of the ATN, the timecode, the ID information on the video cassette, and the date and time information is stored in the maker note area as a Tag in this embodiment.

Referring to FIG. 27, TimeCode is an item indicating a timecode on the magnetic tape. ATN is an item indicating an ATN on the magnetic tape. UUID is an item indicating an identification number of the video cassette housing the magnetic tape. RecordingDate is an item indicating a date when the clip associated with the index image is captured. RecordingTime is an item indicating a time when the clip associated with the index image is captured. Tag Number indicates a number identifying the Tag. Type indicates a data type of the Tag. BYTE indicates eight-bit unsigned integer and LONG indicates 32-bit (four-byte) unsigned integer. Count indicates the number of pieces of data having the data type indicated in the Type for every Tag. Number of Tags indicates the number of Tags included in the maker note area. Level indicates the necessity of the Tag. If the level has a value Mandatory (M), the tag must be recorded in the maker note area as long as there is no limit in the hardware. If the Level has a value Optional (O), the Tag is optional.

According to this embodiment, in order to store in the index image the information, such as the ATN, the timecode, the ID information on the video cassette, and the date and time information, associated with the index image, it is sufficient for the camcorder 101 to transfer only the index image to the PC 103. Accordingly, the transfer time and the waiting time of the operator are advantageously reduced, thus improving the responsiveness.

Although the primary image of the Exif file is transferred in this embodiment, only the thumbnail image in the Exif file may be transferred and the information, such as the ATN, the timecode, the ID information on the video cassette, and the date and time information, may be transferred later. In this case, since the thumbnail image has lower volume, the transfer time and the waiting time of the operator are advantageously reduced, thus improving the responsiveness.

Operation of Identifying Cassette on PC

According to this embodiment, the index image and the information including the tape position information (for example, the ATN and the timecode), the ID information on the video cassette, and the date and time information, associated with the index image, are transferred from the camcorder 101 to the PC 103 through the D-I/F 19, and then are recorded in the HD in the PC 103. An operation of identifying the video cassette on the PC 103 in this case, when the connection between the camcorder 101 and the PC 103 is broken and is established again, is described below.

Figure 17:
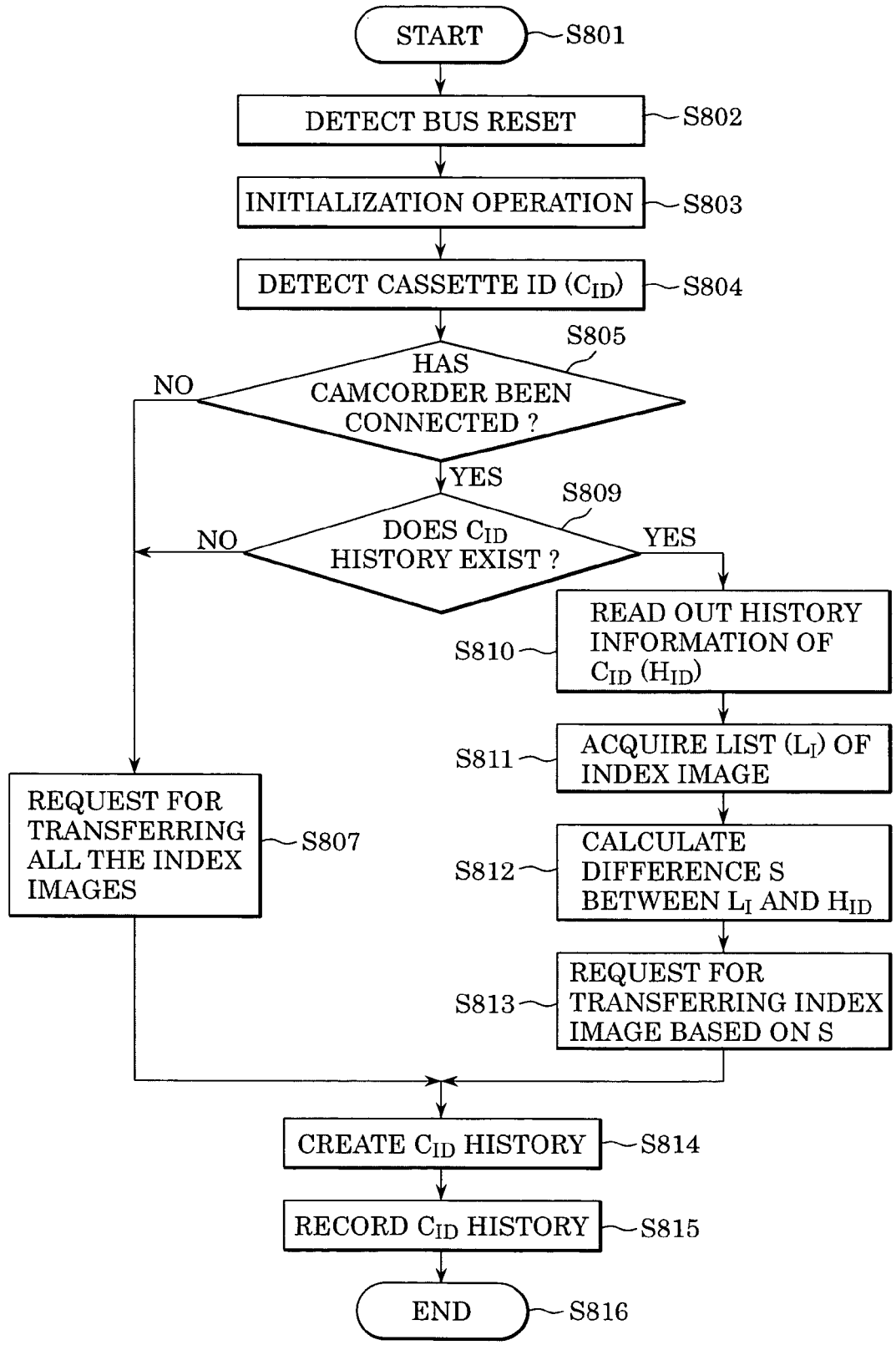
FIG. 17 is a flowchart showing a process of identifying a video cassette in an application on a PC.

FIG. 17 is a flowchart showing the process of identifying the video cassette in an application on the PC 103. Referring to FIG. 17, in Step S801, the process starts the operation. In Step S802, the process detects a bus reset. In Step S803, the process performs an initialization operation when the bus reset occurs. In Step S804, the cassette identification information ($C_{ID}$) on the video cassette mounted in the camcorder 101 is transferred from the camcorder 101, and the process detects the $C_{ID}$.

In Step S805, the process detects, from the HD in the PC 103, whether the camcorder 101 has ever been connected to the application on the PC 103. If the camcorder 101 has not been connected to the application on the PC 103, in Step S807, the process transmits to the camcorder 101 a request for transferring all the index images and the data including the positional data on the magnetic tape and the date and time data, associated with the index images, and the camcorder 101 transfers the above data.

If the camcorder 101 has ever been connected to the application on the PC 103 in Step S805, then in Step S809, the process determines whether history information concerning the cassette identification information ($C_{ID}$) is recorded in the HD in the PC 103. If the process determines that the no history information is recorded in Step S809, then in Step S807, the process transmits to the camcorder 101 a request for transferring all the index images and the data including the positional data on the magnetic tape and the date and time data, associated with the index images, and the camcorder 101 transfers the above data.

If the process determines that the history information concerning the cassette identification information ($C_{ID}$) is recorded in the HD in the PC 103 in Step S809, then in S810, the process reads out the history information ($H_{ID}$) concerning the cassette identification information ($C_{ID}$) from the HD in the PC 103. In Step S811, the process reads out list information ($L_I$) on the index image from the removable recording medium 30 mounted in the camcorder 101. According to this embodiment, for example, the history information ($H_{ID}$) and the list information ($L_I$) are recorded on the same recording format.

In Step S812, the process calculates difference information S between the history information ($H_{ID}$) and the list information ($L_I$). In Step S813, the process transmits a request for transferring index image information that is not included in the history information ($H_{ID}$) based on the calculated difference information S. The difference index image and the data including the positional data on the magnetic tape and the date and time data, associated with the index image, are read out from the camcorder 101.

In Step S814, the process creates new history information concerning the cassette identification information ($C_{ID}$). If Step S807 is performed before Step S814, the history information is created from all the index image information. If the S813 is performed before Step S814, the history information concerning the cassette identification information ($C_{ID}$) is created from the previous history information and the difference index image information read out from the camcorder 101. The history information is kept up to date by the above operation.

In Step S815, the process records the history information concerning the cassette identification information ($C_{ID}$), created by the above operation, in the HD in the PC 103. In Step S816, the process is completed. With the operation described above, the PC 103 can automatically select the index image information recorded in the HD in the PC 103 and the information including the positional data on the magnetic tape and the date and time data, associated with the index image. Accordingly, it is possible to transfer only the necessary index images, so that the time required for the transfer is reduced and the responsiveness for the operator is improved.

Operation on PC

Figure 18:
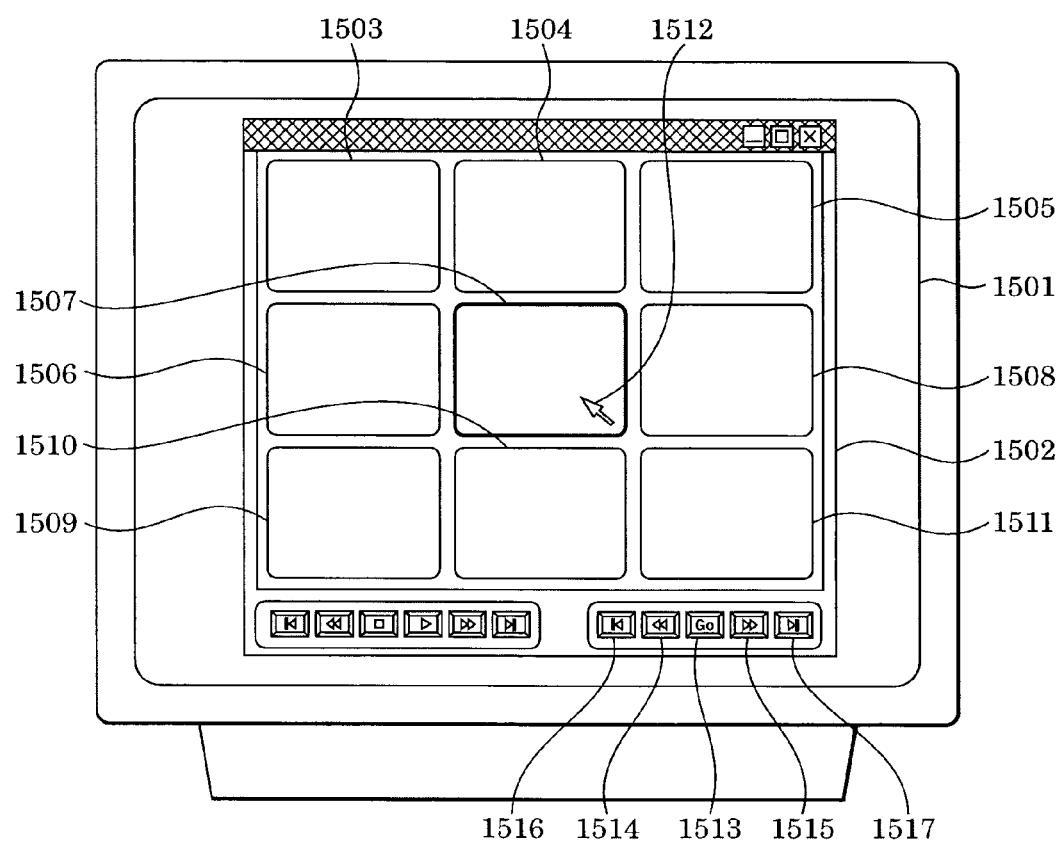
FIG. 18 is a diagram for describing an application on the PC.

An operation of an application on the PC 103, according to an embodiment of the present invention, is described below with reference to FIG. 18. Referring to FIG. 18, reference numeral 1501 denotes a monitor screen, reference numeral 1502 denotes an application window, reference numerals 1503 to 1511 denote index-image display areas, reference numeral 1512 denotes a pointer cursor, reference numeral 1513 denotes a start search button, reference numerals 1514 and 1515 denote index-image scroll buttons, and reference numerals 1516 and 1517 denote jump buttons.

In the application of this embodiment, index image information relating to a cassette mounted in a camcorder is automatically selected based on cassette identification information, and the selected index image information is displayed.

When an operator operates a pointing device (not shown), such as a mouse, to move the pointer cursor 1512 and selects any of the index-image display areas 1503 to 1511, the selected index image is highlighted. For example, the index image in the index-image display area 1507 is displayed in FIG. 18. When the operator further moves the pointer cursor 1512 in this state and presses the start search button 1513, the tape position information associated with the index image in the index-image display area 1507 is read out from the HD in the PC 103.

The tape position information includes, for example, an ATN and a timecode. The application of this embodiment uses the tape position information to search for a position on the tape. According to this embodiment, the application on the PC 103 first issues, for example, an ATN command. The ATN command is compliant with a known AV/C Tape Recorder/Player subunit specification (IEEE 1394 Trade Association). The command set in the above specification is a collection of the CTS commands described above. The camcorder 101, which receives the ATN command, transmits an INTERIM response to the PC 103 to start an ATN search operation. The camcorder 101 feeds the magnetic tape to a position near an ATN value set in the ATN command and suspends the tape drive to be in a PLAY FORWARD PAUSE state. The camcorder 101 returns an ACCEPTED response to the ATN command to the PC 103.

The PC 103, which receives the ACCEPTED response, then issues a timecode command. In response the timecode command, the camcorder 101 stores the timecode currently read out in the response frame and returns the stored timecode to the PC 103. The application on the PC 103 reads out the timecode at the current position of the camcorder 101, on the magnetic tape, using the timecode command.

The application on the PC 103 then compares the timecode value received from the camcorder 101 with the (target) timecode value read out from the HD to determine a direction at which the magnetic tape is fed. If the timecode value read out from the HD is larger than the timecode value received from the camcorder 101, the application on the PC 103 issues a PLAY NEXT FRAME command. If the timecode value read out from the HD is smaller than the timecode value received from the camcorder 101, the application on the PC 103 issues a PLAY PREVIOUS FRAME command. If the timecode value read out from the HD is equal to the timecode value received from the camcorder 101, the process is completed.

Figure 19:
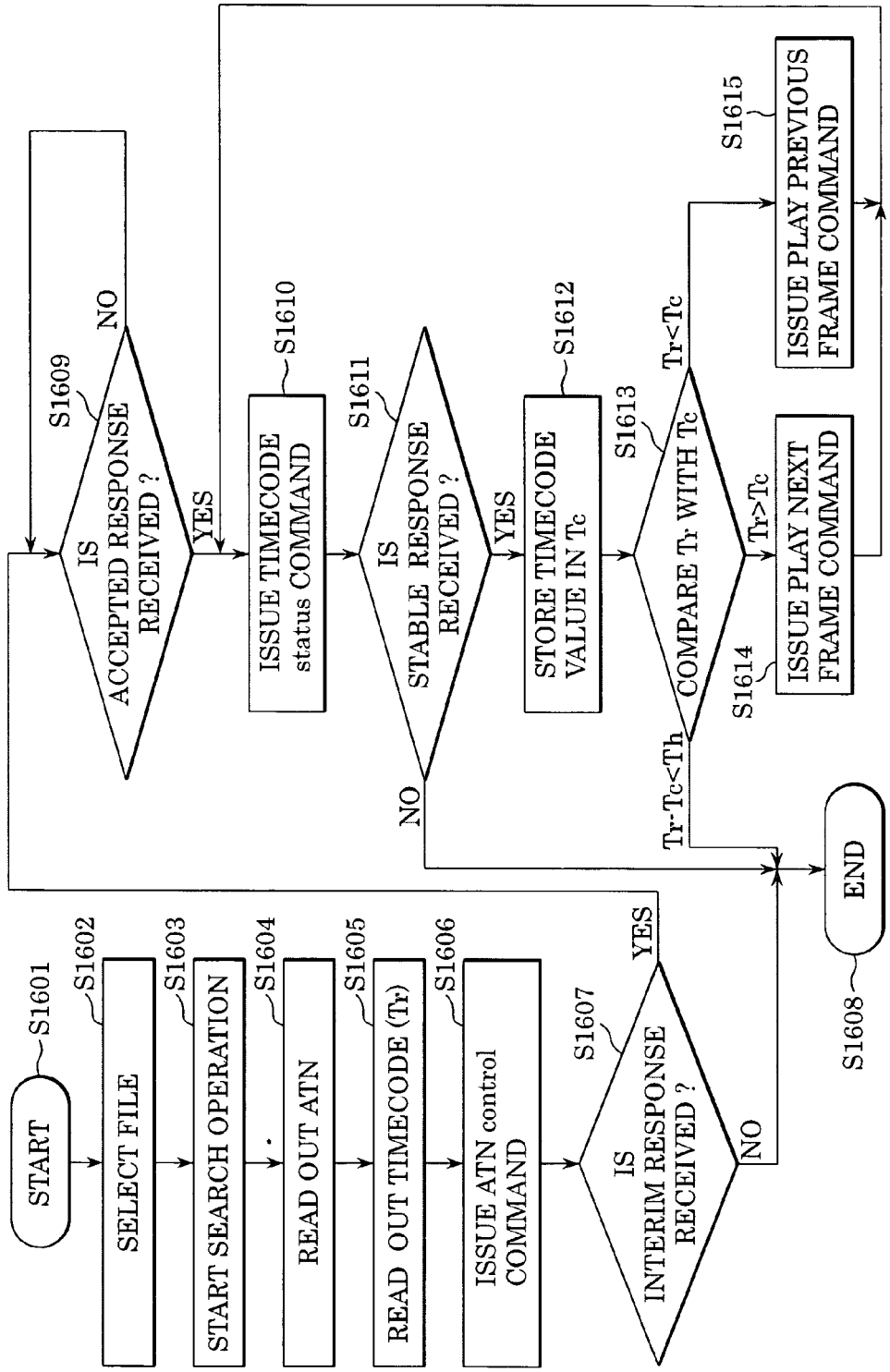
FIG. 19 is a flowchart showing an operation of the application on the PC.

FIG. 19 is a flowchart showing the operation of the application on the PC 103. Referring to FIG. 19, in Step S1601, the process is started. In Step S1602, an operator selects an index image. In Step S1603, the process starts a search operation associated with the selected index image. The search operation is started with an operation by the operator on the application in the PC 103. In Step S1604, the process reads out an ATN associated with the selected index image. In Step S1605, the process reads out a timecode associated with the selected index image and stores the value of the timecode in a variable Tr. In Step S1606, the process issues an ATN control command to the camcorder 101. In Step S1607, the process checks a first response to the ATN control command. If the response has a value other than INTERIM, in Step S1608, the process is completed because an illegal value is set in the ATN control command or the camcorder 101 cannot detect the ATN.

If the response has the value INTERIM in Step S1607, then in Step S1609, the process waits for an ACCEPTED response. If the process receives the ACCEPTED response in Step S1609, then in Step S1610, the process issues a status command of the timecode to the camcorder 101. In Step S1611, the process checks a response to the status command of the timecode. If a response other than STABLE is received, in Step S1608, the process is completed because an illegal value is set in the status command of the timecode or the camcorder 101 cannot detect the timecode. If the STABLE response is received in Step S1611, then in Step S1612, the process stores the detected timecode in a variable Tc.

In Step S1613, the process compares the value of the variable Tr with the value of the variable Tc. If the difference between the values of the Tr and of the Tc is smaller than a predetermined threshold value Th, the process determines that the magnetic tape reaches the target position and, in Step S1608, the process is completed. If the difference between the values of the Tr and of the Tc is larger than or equal to the predetermined threshold value Th and the Tr is larger than the Tc in Step S1613, then in Step S1614, the process issues a PLAY NEXT FRAME control command to the camcorder 101. In response to the PLAY NEXT FRAME control command, the camcorder 101 forwards the tape by one frame. If the difference between the values of the Tr and of the Tc is larger than or equal to the predetermined threshold value Th and the Tr is smaller than the Tc in Step S1613, then in Step S1615, the process issues a PLAY PREVIOUS FRAME control command to the camcorder 101. In response to the PLAY PREVIOUS FRAME control command, the camcorder 101 rewinds the tape by one frame. Steps S1610 to S1015 form a processing loop. The tape in the camcorder 101 can be stopped at a position within a predetermined error range from the target position by the use of this loop.

As described above, in the application on the PC 103 of this embodiment, it is sufficient for the operator to select one index image while watching the index images in order to move the tape in the camcorder 101 to the tape position indicated by selected the index image, thus noticeably improving the responsiveness. In addition, the operator can search for a desired tape position while watching the index images, thus advantageously improving the responsiveness. Furthermore, since the data on a memory card inserted in the camcorder 101 is recorded in the HD in the PC 103 and is backed up, it is possible to protect the data even when the operator erroneously deletes the data on the memory card or overwrites the data on the memory card.

Another Embodiment

Figure 20:
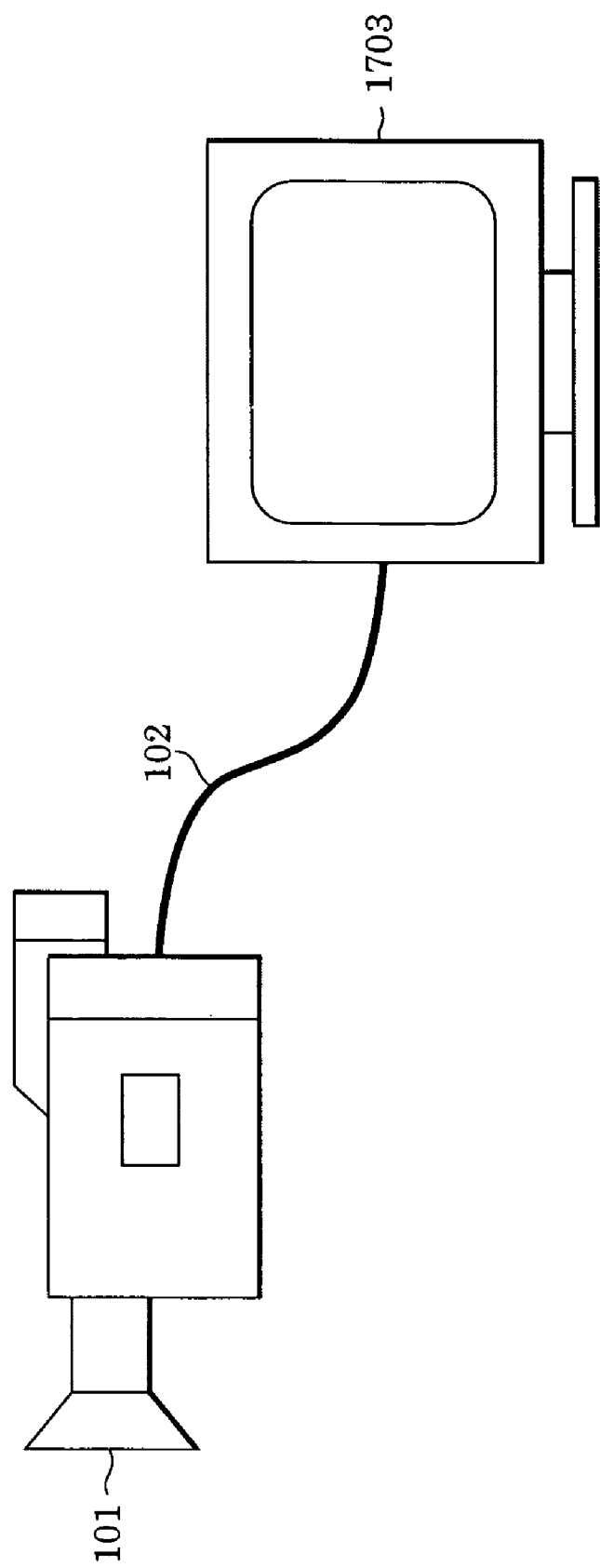
FIG. 20 illustrates an example of the structure of another system including the camcorder.

The present invention is applied to a digital television (TV) set, a set-top box, or the like. An embodiment in which the present invention is applied to a digital TV set is described below with reference to FIG. 20. The same reference numerals are used in FIG. 20 to identify the components having the same functions as in FIG. 5. Referring to FIG. 20, reference numeral 1703 denotes a digital TV set. The digital TV set 1703, which is provided with a D-I/F, is connected to the camcorder 101 via the IEEE1394 cable 102.

When the camcorder 101 is connected to the digital TV set 1703 via the IEEE1394 cable 102, a bus reset occurs. The digital TV set 1703 performs an initialization operation relating to the IEEE1394-compliant hardware using the bus reset as a trigger. Similarly, the camcorder 101 performs an initialization operation relating the IEEE1394 using the bus reset as a trigger.

The operation of the camcorder 101 is described with reference to the flowchart shown in FIG. 6. In Step S401, the operation of the camcorder 101 is started. In Step S402, the camcorder 101 detects whether a bus reset occurs. If the bus reset does not occur, the camcorder 101 continues the operation of detecting a bus reset. If a bus reset occurs, then in Step S403, the camcorder 101 performs an initialization operation after the bus reset has occurred.

After performing the initialization operation, in Step S410, the camcorder 101 detects whether identification information on the video cassette is read out. As described above, the identification information on the video cassette is recorded in part of the pack area on the magnetic tape 11. If the identification information on the video cassette is read out in Step S410, then in Step S411, the camcorder 101 transmits the identification information on the video cassette to the digital TV set 1703 through the D-I/F 19. If the identification information on the video cassette is not read out in Step S410, the camcorder 101 waits for the readout of the identification information on the video cassette and, in Step S411, transmits the identification information on the video cassette to the digital TV set 1703 through the D-I/F 19.

In Step S404, the camcorder 101 transmits a request for receiving an index to the digital TV set 1703. In Step S405, the camcorder 101 determines whether the transmission of the index is completed. If the transmission of the index is not completed, the camcorder 101 continues the transmission of the index. If the transmission of the index is completed, the camcorder 101 proceeds to Step S406. In Step S406, the camcorder 101 transmits to the digital TV set 1703 a request for receiving positional data, on the magnetic tape, associated with the index. In Step S407, the camcorder 101 determines whether the transmission of the positional data on the magnetic tape is completed. If the transmission of the positional data on the magnetic tape is not completed, the camcorder 101 continues the transmission of the positional data. If the transmission of the positional data on the magnetic tape is completed, the camcorder 101 proceeds to Step S408.

In Step S408, the camcorder 101 determines whether the above operation is completed for all the indexes. Steps from S405 to S408 form a processing loop. If the above operation is not completed for all the indexes, the camcorder 101 repeats the transmission of the index and the transmission of the positional data, on the magnetic tape, associated with the index. If the above operation is completed for all the indexes, in Step S409, the camcorder 101 completes the operation.

After the camcorder 101 completes the series of initialization operations subsequent to the bus reset, the camcorder 101 uses, for example, a communication protocol called the asynchronous connection to transmit to the digital TV set 1703 the index image and the data, such as the time code and the ATN, associated with the index image. The digital TV set 1703 records the data including the timecode and the ATN in a flash memory in the digital TV set 1703.

Operation of Identifying Cassette on Digital TV Set

According to this embodiment, the index image and the information including the tape position information (for example, the ATN and the timecode), the ID information on the video cassette, and the date and time information, associated with the index image, are transferred from the camcorder 101 to the digital TV set 1703 through the D-I/F 19, and then are recorded in the flash memory in the digital TV set 1703. An operation of identifying the video cassette on the digital TV set 1703 in this case, when the connection between the camcorder 101 and the digital TV set 1703 is broken and is established again, is described below.

A process of identifying the video cassette in an application on the digital TV set 1703 is described next with reference to the flowchart in FIG. 17. Referring to FIG. 17, in Step S801, the process starts the operation. In Step S802, the process detects a bus reset. In Step S803, the process performs an initialization operation when the bus reset occurs. In Step S804, the cassette identification information ($C_{ID}$) on the video cassette mounted in the camcorder 101 is transferred from the camcorder 101, and the process detects the $C_{ID}$.

In Step S805, the process detects, from the flash memory in the digital TV set 1703, whether the camcorder 101 has ever been connected to the application on the digital TV set 1703. If the camcorder 101 has not been connected to the application on the digital TV set 1703, in Step S807, the process transmits to the camcorder 101 a request for transferring all the index images and the data including the positional data on the magnetic tape and the date and time data, associated with the index images, and the camcorder 101 transfers the above data.

If the camcorder 101 has ever been connected to the application on the digital TV set 1703 in Step S805, then in Step S809, the process determines whether history information concerning the cassette identification information ($C_{ID}$) is recorded in the flash memory in the digital TV set 1703. If the process determines that the no history information is recorded in Step S809, then in Step S807, the process transmits to the camcorder 101 a request for transferring all the index images and the data including the positional data on the magnetic tape and the date and time data, associated with the index images, and the camcorder 101 transfers the above data.

If the process determines that the history information concerning the cassette identification information ($C_{ID}$) is recorded in the flash memory in the digital TV set 1703 in Step S809, then in S810, the process reads out the history information ($H_{ID}$) concerning the cassette identification information ($C_{ID}$) from the flash memory in the digital TV set 1703. In Step S811, the process reads out list information ($L_I$) on the index image from the removable recording medium 30 mounted in the camcorder 101. According to this embodiment, for example, the history information ($H_{ID}$) and the list information ($L_I$) are recorded on the same recording format.

In Step S812, the process calculates difference information S between the history information ($H_{ID}$) and the list information ($L_I$). In Step S813, the process transmits a request for transferring index image information that is not included in the history information ($H_{ID}$) based on the calculated difference information S. The difference index image and the data including the positional data on the magnetic tape and the date and time data, associated with the index image, are read out from the camcorder 101.

In Step S814, the process creates new history information concerning the cassette identification information ($C_{ID}$). If Step S807 is performed before Step S814, the history information is created from all the index image information. If the S813 is performed before Step S814, the history information concerning the cassette identification information ($C_{ID}$) is created from the previous history information and the difference index image information read out from the camcorder 101. The history information is kept up to date by the above operation.

In Step S815, the process records the history information concerning the cassette identification information ($C_{ID}$), created by the above operation, in the flash memory in the digital TV set 1703. In Step S816, the process is completed. With the operation described above, the digital TV set 1703 can automatically select the index image information recorded in the flash memory in the digital TV set 1703 and the information including the positional data on the magnetic tape and the date and time data, associated with the index image. Accordingly, it is possible to transfer only the necessary index images, so that the time required for the transfer is reduced and the responsiveness for the operator is improved.

Operation on Digital TV Set

Figure 21A:
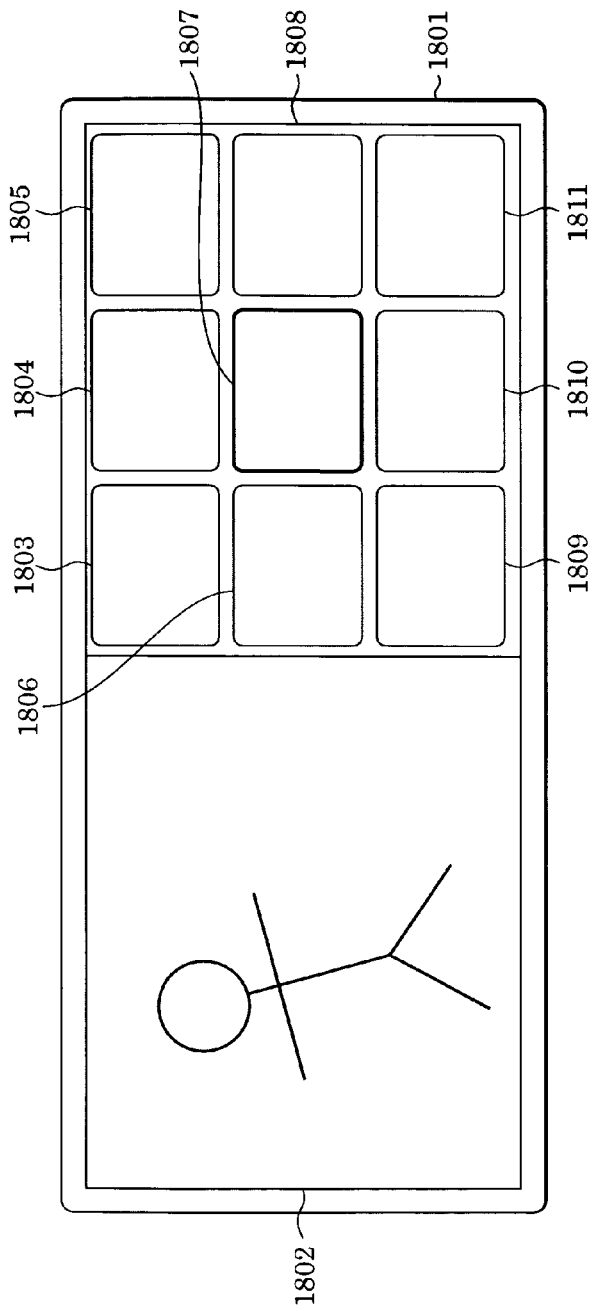
FIGS. 21A and 21B are diagrams for describing an application on a digital TV set.
Figure 21B:
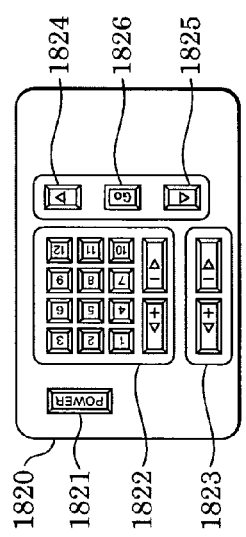

An operation of an application on the digital TV set 1703, according to an embodiment of the present invention, is described below with reference to FIGS. 21A and 21B. Referring to FIG. 21A, reference numeral 1801 denotes a digital TV screen, reference numeral 1802 denotes a main screen, and reference numerals 1803 to 1811 denote index screens for displaying the index images. Referring to FIG. 21B, reference numeral 1820 denotes an infrared remote controller (hereinafter referred to as remote controller) with which the digital TV set 1703 is operated, reference numeral 1821 denotes a power button, reference numeral 1822 denotes a channel-selection button group, reference numeral 1823 denotes a volume-control button group, reference numerals 1824 and 1825 denote index selection buttons for selecting an index, and reference numeral 1826 denotes a start search button.

In the application of this embodiment, index image information relating to a cassette mounted in a camcorder is automatically selected based on cassette identification information, and the selected index image information is displayed.

When an operator operates the index selection buttons 1824 and 1825 to select any of the index screens in the index screens 1803 to 1811, the selected index image is highlighted. For example, the index image in the index screen 1807 is displayed in FIG. 21A. When the operator presses the start search button 1826 on the remote controller 1820 in this state, the tape position information associated with the index image in the index screen 1807 is read out from the flash memory in the digital TV set 1703.

The tape position information includes, for example, an ATN and a timecode. The application on the digital TV set 1703 of this embodiment uses the tape position information to search for a position on the tape. According to this embodiment, the application on the digital TV set 1703 first issues, for example, an ATN command. The ATN command is compliant with a known AV/C Tape Recorder/Player subunit specification (IEEE 1394 Trade Association). The command set in the above specification is a collection of the CTS commands described above. The camcorder 101, which receives the ATN command, transmits an INTERIM response to the digital TV set 1703 to start an ATN search operation. The camcorder 101 feeds the magnetic tape to a position near an ATN value set in the ATN command and suspends the tape drive to be in a PLAY FORWARD PAUSE state. The camcorder 101 returns an ACCEPTED response to the ATN command to the digital TV set 1703.

The digital TV set 1703, which receives the ACCEPTED response, then issues a timecode command. In response the timecode command, the camcorder 101 stores the timecode currently read out in the response frame and returns the stored timecode to the digital TV set 1703. The application on the digital TV set 1703 reads out the timecode at the current position of the camcorder 101, on the magnetic tape, using the timecode command.

The application on the digital TV set 1703 then compares the timecode value received from the camcorder 101 with the (target) timecode value read out from the flash memory to determine a direction at which the magnetic tape is fed. If the timecode value read out from the flash memory is larger than the timecode value received from the camcorder 101, the application on the digital TV set 1703 issues a PLAY NEXT FRAME command. If the timecode value read out from the flash memory is smaller than the timecode value received from the camcorder 101, the application on the digital TV set 1703 issues a PLAY PREVIOUS FRAME command. If the timecode value read out from the flash memory is equal to the timecode value received from the camcorder 101, the process is completed.

The operation of the application on the digital TV set 1703 is described below with reference to FIG. 19. Referring to FIG. 19, in Step S1601, the process is started. In Step S1602, an operator selects an index image. In Step S1603, the process starts a search operation associated with the selected index image. The search operation is started with an operation by the operator on the application in the digital TV set 1703. In Step S1604, the process reads out an ATN associated with the selected index image. In Step S1605, the process reads out a timecode associated with the selected index image and stores the value of the timecode in a variable Tr. In Step S1606, the process issues an ATN control command to the camcorder 101. In Step S1607, the process checks a first response to the ATN control command. If the response has a value other than INTERIM, in Step S1608, the process is completed because an illegal value is set in the ATN control command or the camcorder 101 cannot detect the ATN.

If the response has the value INTERIM in Step S1607, then in Step S1609, the process waits for an ACCEPTED response. If the process receives the ACCEPTED response in Step S1609, then in Step S1610, the process issues a status command of the timecode to the camcorder 101. In Step S1611, the process checks a response to the status command of the timecode. If a response other than STABLE is received, in Step S1608, the process is completed because an illegal value is set in the status command of the timecode or the camcorder 101 cannot detect the timecode. If the STABLE response is received in Step S1611, then in Step S1612, the process stores the detected timecode in a variable Tc.

In Step S1613, the process compares the value of the variable Tr with the value of the variable Tc. If the difference between the values of the Tr and of the Tc is smaller than a predetermined threshold value Th, the process determines that the magnetic tape reaches the target position and, in Step S1608, the process is completed. If the difference between the values of the Tr and of the Tc is larger than or equal to the predetermined threshold value Th and the Tr is larger than the Tc in Step S1613, then in Step S1614, the process issues a PLAY NEXT FRAME control command to the camcorder 101. In response to the PLAY NEXT FRAME control command, the camcorder 101 forwards the tape by one frame. If the difference between the values of the Tr and of the Tc is larger than or equal to the predetermined threshold value Th and the Tr is smaller than the Tc in Step S1613, then in Step S1615, the process issues a PLAY PREVIOUS FRAME control command to the camcorder 101. In response to the PLAY PREVIOUS FRAME control command, the camcorder 101 rewinds the tape by one frame. Steps S1610 to S1015 form a processing loop. The tape in the camcorder 101 can be stopped at a position within a predetermined error range from the target position by the use of this loop.

As described above, in the application on the digital TV set 1703 of this embodiment, it is sufficient for the operator to select one index image while watching the index images in order to move the tape in the camcorder 101 to the tape position indicated by selected the index image, thus noticeably improving the responsiveness. In addition, the operator can search for a desired tape position while watching the index images, thus advantageously improving the responsiveness. Furthermore, since the data on a memory card inserted in the camcorder 101 is recorded in the flash memory in the digital TV set 1703 and is backed up, it is possible to protect the data even when the operator erroneously deletes the data on the memory card or overwrites the data on the memory card.

Other Embodiments

The object of the present invention can be attained by the computer (or the CPU or the MPU) in a system or an apparatus in which a storage medium storing program code of software for achieving the functions of the embodiments described above is provided. The computer that reads and executes the program code stored in the storage medium can achieve the functions of the embodiments described above.

In the above case, the program code itself, read out from the storage medium, achieves the functions of the embodiments described above. The program code itself and the storage medium storing the program code constitute the present invention.

Storage media for supplying the program code include a flexible disk, a hard disk, an optical disc, a magneto-optical disk, a CD-ROM, a CD-R, a magnetic tape, a nonvolatile memory card, and a ROM.

The computer can execute the read program code to achieve the functions of the embodiments described above. Or, the operating system, the basic system, or the like running on the computer can execute all or part of the actual processing based on the instructions in the program code to achieve the functions of the embodiments described above.

Alternatively, after the program code read out from the storage medium has been written in a memory that is provided in a function expansion board included in the computer or in a function expansion unit connected to the computer, the CPU or the like in the function expansion board or the function expansion unit can execute all or part of the actual processing based on the instructions in the program code to realize the functions of the embodiments described above.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-404881 filed Dec. 3, 2003, which is hereby incorporated by reference herein.

What is claimed is:

1. An image capture apparatus comprising:
a first recording unit adapted to record a moving image on a first recording medium connected to the image capture apparatus;
a second recording unit adapted to record, on a second recording medium connected to the image capture apparatus, related information including information being used to generate a search command for searching the first recording medium to find the moving image; and
a controlling unit adapted to (a) control the image capture apparatus to transmit the related information reproduced from the second recording medium to a controller connected to the image capture apparatus and (b) control the image capture apparatus based on the search command received from the controller to search the first recording medium to find the moving image.

2. The image capture apparatus according to claim 1, wherein the related information includes information indicating a position where the moving image is recorded.

3. The image capture apparatus according to claim 1, wherein the related information includes information identifying the first recording medium.

4. The image capture apparatus according to claim 1, wherein the related information includes first information indicating a position where the moving image is recorded and second information identifying the first recording medium.

5. The image capture apparatus according to claim 1, wherein the first recording medium and the second recording medium are removable.

6. A control method of controlling an image capture apparatus, the control method comprising steps of:
recording a moving image on a first recording medium connected to the image capture apparatus;
recording, on a second recording medium connected to the image capture apparatus, related information including information being used to generate a search command for searching the first recording medium to find the moving image;
controlling the image capture apparatus to transmit the related information reproduced from the second recording medium to a controller connected to the image capture apparatus; and
controlling the image capture apparatus based on the search command received from the controller to search the first recording medium to find the moving image.

7. The control method according to claim 6, wherein the related information includes information indicating a position where the moving image is recorded.

8. The control method according to claim 6, wherein the related information includes information identifying the first recording medium.

9. The control method according to claim 6, wherein the related information includes first information indicating a position where the moving image is recorded and second information identifying the first recording medium.

10. The control method according to claim 6, wherein the first recording medium and the second recording medium are removable.

* * * * *